United States Patent
Lyren

(10) Patent No.: US 9,965,553 B2
(45) Date of Patent: May 8, 2018

(54) USER AGENT WITH PERSONALITY

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 1309 days.

(21) Appl. No.: 13/904,308

(22) Filed: May 29, 2013

(65) Prior Publication Data
US 2014/0359439 A1   Dec. 4, 2014

(51) Int. Cl.
*G06F 17/30* (2006.01)
*G06F 3/01* (2006.01)

(52) U.S. Cl.
CPC ........ *G06F 17/30864* (2013.01); *G06F 3/011* (2013.01); *G06F 17/30867* (2013.01); *G06F 17/30702* (2013.01)

(58) Field of Classification Search
CPC .. G06F 3/04847; G06F 9/4446; G06F 9/4451; H04N 21/4532; G06N 3/006; G06N 21/4532
See application file for complete search history.

(56) References Cited

U.S. PATENT DOCUMENTS

| | | | | |
|---|---|---|---|---|
| 6,340,977 B1 * | 1/2002 | Lui | ...................... | G06F 9/4446 715/706 |
| 7,134,130 B1 * | 11/2006 | Thomas | ................ | H04N 7/163 348/E7.061 |
| 7,715,790 B1 * | 5/2010 | Kennedy | ............. | H04M 1/7253 455/41.2 |
| 7,930,762 B1 * | 4/2011 | Blair | ..................... | H04N 7/163 725/135 |
| 8,223,372 B2 * | 7/2012 | Kunioka | ........... | H04N 1/00222 358/1.13 |
| 8,977,654 B1 * | 3/2015 | Buyukkokten | ... | G06F 17/30616 707/802 |
| 9,462,321 B2 * | 10/2016 | Roberts | ............. | H04N 7/17318 |
| 2004/0101127 A1 * | 5/2004 | Dezonno | .............. | H04M 3/523 379/265.02 |
| 2006/0248461 A1 * | 11/2006 | Yamada | ................. | G06Q 10/00 715/706 |
| 2008/0027924 A1 * | 1/2008 | Hamilton | ......... | G06F 17/30867 |
| 2008/0146343 A1 * | 6/2008 | Sullivan | ................. | A63F 13/12 463/42 |
| 2008/0235023 A1 * | 9/2008 | Kennewick | ............ | G10L 15/22 704/257 |
| 2008/0311889 A1 * | 12/2008 | Dunko | ................... | H04L 67/20 455/414.1 |
| 2010/0103316 A1 * | 4/2010 | Colsey | ................. | H04L 12/282 348/552 |
| 2011/0007079 A1 * | 1/2011 | Perez | ..................... | G06F 3/011 345/473 |
| 2012/0116861 A1 * | 5/2012 | Dobyns | ............. | G06Q 30/0234 705/14.34 |
| 2013/0125026 A1 * | 5/2013 | Gaume | ................. | G06Q 10/10 715/757 |

* cited by examiner

*Primary Examiner* — Alvin Tan

(57) ABSTRACT

A method builds a personality of a user agent that is based on verbal and nonverbal communication preferences of a person. The user agent executes a search request from a user and displays results to the search request based on the personality of the user agent opposed to a personality of the user.

18 Claims, 13 Drawing Sheets

USER AGENT WITH PERSONALITY

BACKGROUND

Intelligent software agents can perform various tasks for users, such as assisting the user in executing searches on the Internet, updating schedules, and responding to user requests. In some instances, users can interact with the software agent using a natural language user interface. These software agents are becoming increasingly more important as a mechanism for users to interface with electronic devices.

SUMMARY OF THE INVENTION

One example embodiment is a method that combines verbal and nonverbal communication preferences of a person to create a personality of the person that is provided into a personality of a user agent. This user agent executes a search for a user and orders results to the search based on the personality of the user agent as opposed to a personality of the user.

DETAILED DESCRIPTION

Example embodiments include systems, apparatus, and methods that include intelligent user agents with personalities.

Intelligent user agents or user agents with a personality have distinctive and/or unique behaviors from each other. As such, two user agents with different personalities can communicate identical information in different ways according to their personalities. For example, conversational user agents with human facial features can express emotion with a variety of different modalities (such as movement of the head, eyebrows, mouth, cheeks, eyelids, forehead, and eyes). Further, body posture and gesticulations with arms, hands, and shoulders can also be used to convey emotional information.

Figure 1:
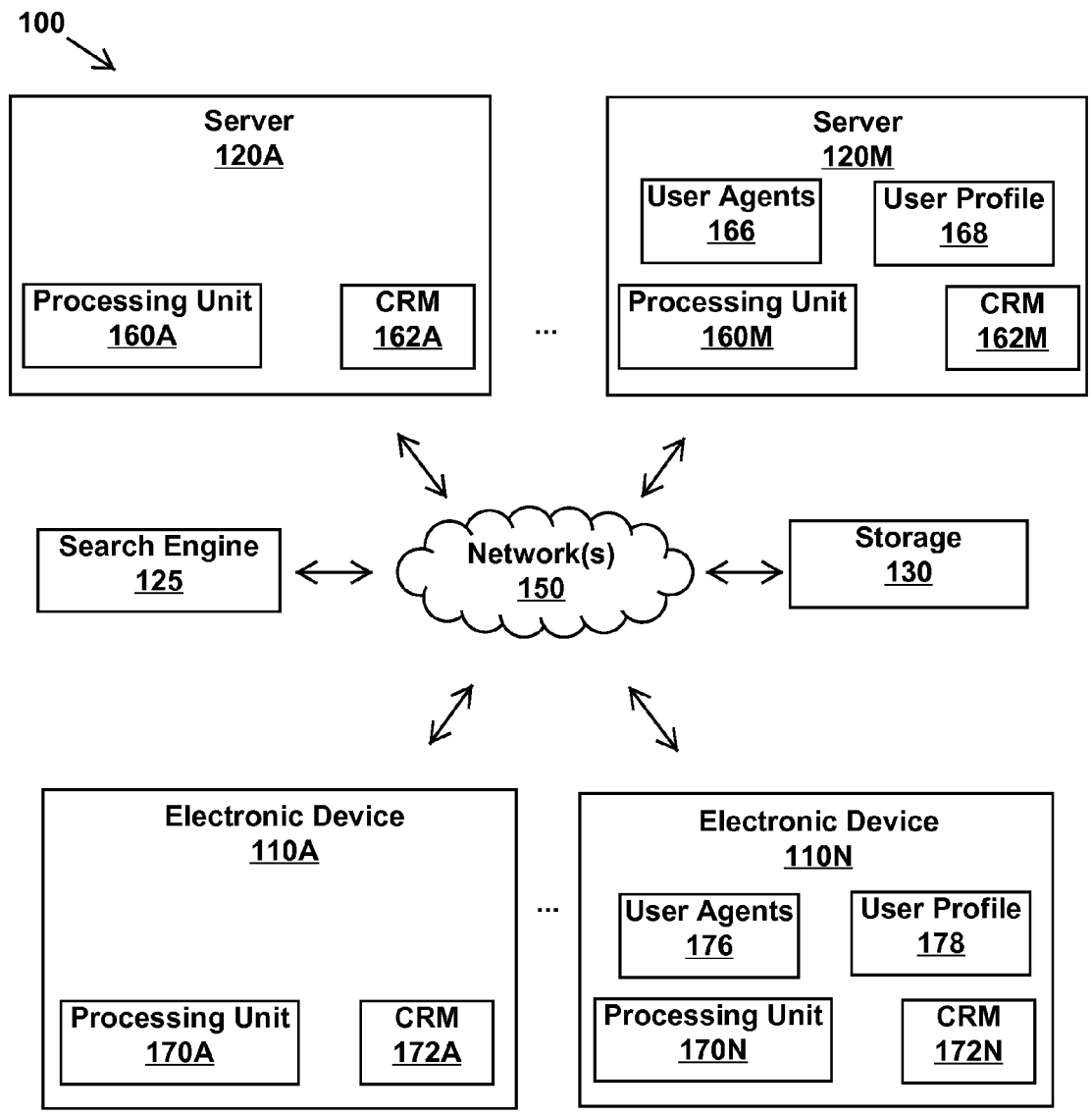
FIG. 1 is a computer system in accordance with an example embodiment.

FIG. 1 is a computer system 100 in accordance with an example embodiment. The computer system includes a plurality of electronic devices 110A to 110N, a plurality of servers 120A to 120M, a search engine 125, and storage 130 in communication with each other through one or more networks 150. Blocks and methods discussed herein are executed with the computer system or one or more of the electronic devices, servers, and/or components therein.

The servers 120A to 120M include a processor unit with one or more processors and computer readable medium (CRM), such as random access memory and/or read only memory. Server 120A includes processor unit 160A and CRM 162A, and server 120M includes processor unit 160M and CRM 162M. The processing unit communicates with the CRM to execute operations and tasks that implement or assist in implementing example embodiments. One or more of the servers can also include a user agent and user profile, such server 120M including user agents 166 and user profile 168.

The electronic devices 110A to 110N include a processor unit with one or more processors and computer readable medium (CRM), such as random access memory and/or read only memory. Electronic device 110A includes processor unit 170A and CRM 172A, and electronic device 110N includes processor unit 170N and CRM 172N. The processing unit communicates with the CRM to execute operations and tasks that implement or assist in implementing example embodiments. One or more of the electronic devices can also include a user agent and a user profile, such as electronic device 110A including user agents 176 and user profile 178.

By way of example, the electronic devices 110A to 110N include, but are not limited to, handheld portable electronic devices (HPEDs), wearable electronic devices (such as glasses), portable electronic devices, computing devices, electronic devices with cellular or mobile phone capabilities, digital cameras, desktop computers, servers, portable computers (such as tablet and notebook computers), handheld audio playing devices (example, handheld devices for downloading and playing music and videos), personal digital assistants (PDAs), combinations of these devices, and other portable and non-portable electronic devices and systems.

The search engine 125 includes software that retrieves data, files, documents, or other information from a database and/or network (such as the Internet). By way of example, the search engine 125 is a web search engine having a software system that searches for information on the World Wide Web.

By way of example, the networks 150 can include one or more of the internet, an intranet, an extranet, a cellular network, a local area network (LAN), a home area network (HAN), metropolitan area network (MAN), a wide area network (WAN), public and private networks, etc.

By way of example, the storage 130 can include various types of storage that include, but are not limited to magnetic storage and optical storage, such as hard disks, magnetic tape, disk cartridges, universal serial bus (USB) flash memory, compact disk read-only memory (CD-ROM), digital video disk read-only memory (DVD-ROM), CD-recordable memory, CD-rewritable memory, photoCD, and web-based storage. Storage can include storage pools that are hosted by third parties, such as an operator of a data center. The electronic devices and/or servers can use the storage to store files, software applications, data objects, etc. Storage can be accessed through a web service application programming interface, a web-based user interface, or other mechanisms.

Figure 2:
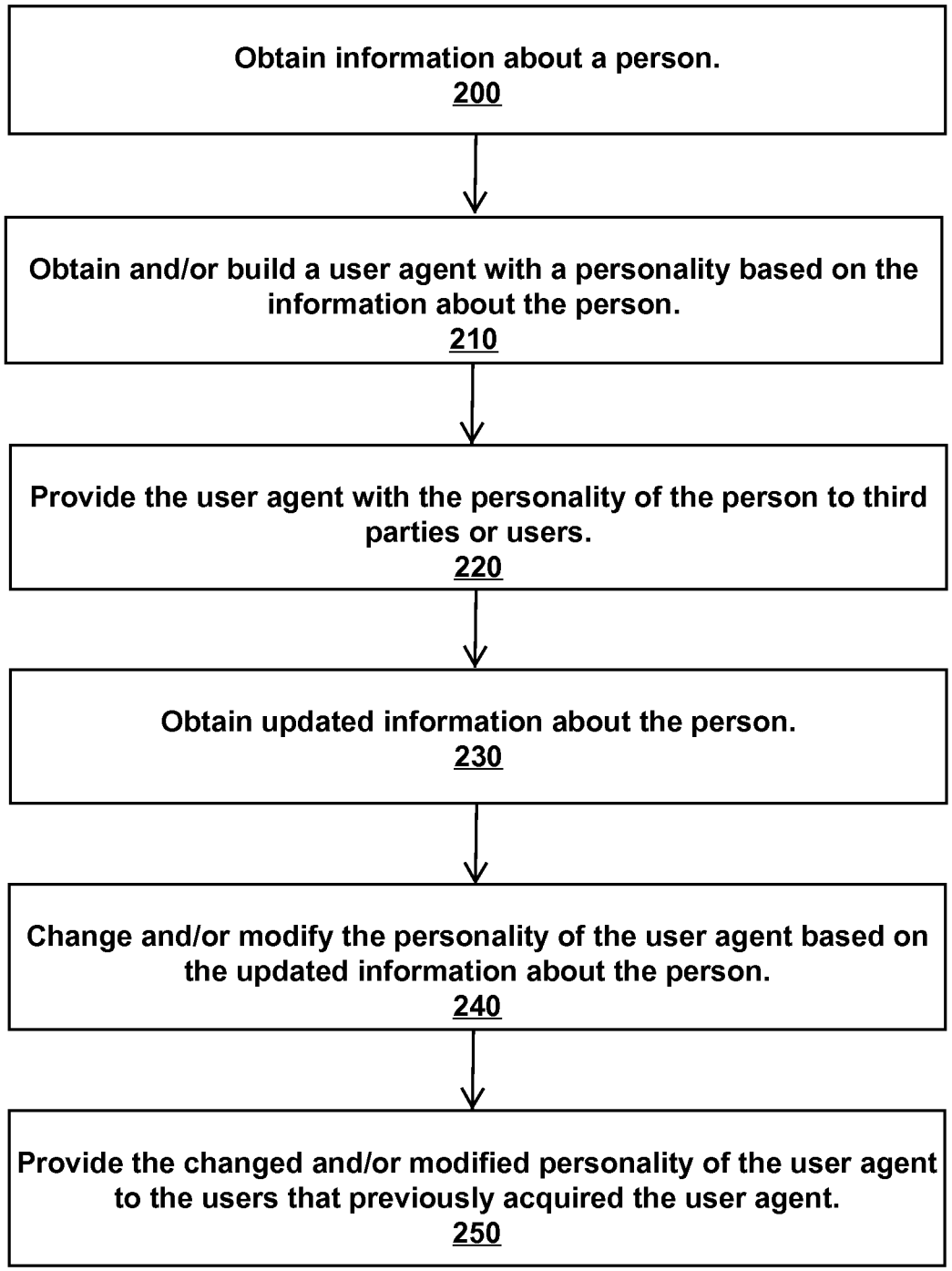
FIG. 2 is a method to modify a personality of a user agent after being provided to users in accordance with an example embodiment.

FIG. 2 is a method to modify a personality of a user agent after being provided to users.

Block 200 states obtain information about a person. For example, the information about and/or from the person is collected, received, gathered, obtained, and/or retrieved. This information includes one or more of public information, private information, semi-private (information having some degree of privacy but not fully private), and semi-public (available to a portion, but not all, of the public).

Information can be obtained from the person, public records, private records, books, newspapers, magazines, Internet, journals, letters, videos, interviews, other persons (such as family, friends, coworkers, witnesses, acquaintances, etc.), interests of the person, influences on the person, timelines, patterns, paintings, accomplishments of the person, chronology of a life of the person, places significant to the person's life, biographies, autobiographies, articles, pictures, writings, sound recordings, tests, examinations, questions, conversations, observations, a user profile, etc.

One or more electronic devices can also monitor and collect data with respect to the person and/or electronic devices, such as electronic devices that the person or the user interacts with and/or owns. By way of example, this data includes user behavior on an electronic device, installed client hardware, installed client software, locally stored client files, information obtained or generated from the user's interaction with a network (such as web pages on the internet), email, peripheral devices, servers, other electronic devices, programs that are executing, etc. The electronic devices collect user behavior on or with respect to an electronic device (such as the user's computer), information about the user, information about the user's computer, and/or information about the computer's and/or user's interaction with the network.

By way of example, a user agent and/or user profile builder monitors user activities and collects information used to create a user profile, and this user profile includes public and private information. The profile builder monitors the user's interactions with one or more electronic devices, the user's interactions with other software applications executing on electronic devices, activities performed by the user on external or peripheral electronic devices, etc. The profile builder collects both content information and context information for the monitored user activities and then stores this information. By way of further illustration, the content information includes contents of web pages accessed by the user, graphical information, audio/video information, uniform resource locators (URLs) visited, searches or queries performed by the user, items purchased over the internet, likes/dislikes of the user, advertisements viewed or clicked, information on commercial or financial transactions, videos watched, music played, interactions between the user and a user interface (UI) of an electronic device, commands (such as voice and typed commands), hyperlinks clicked or selected, etc.

The user profile builder also gathers and stores information related to the context in which the user performed activities associated with an electronic device. By way of example, such context information includes, but is not limited to, an order in which the user accessed web pages (user's browser navigation), a frequency or number of times a user navigated to a web location, information regarding the user's response to interactive advertisements and solicitations, information about a length of time spent by the user on the web pages, information on the time when the user accessed the web pages, etc.

As previously stated, the user profile builder also collects content and context information associated with the user interactions with various different applications executing on one or more electronic devices. For example, the user profile builder monitors and gathers data on the user's interactions with a web browser, an electronic mail (email) application, a word processor application, a spreadsheet application, a database application, a cloud software application, and/or any other software application executing on an electronic device.

By way of illustration, the user profile builder collects content information for emails that include one or more of the recipient information, sender information, email subject title information, and the information related to the contents of the email including attachments. Context information for an email application may include the time when the user receives emails, time when the user sends emails, subject matter of the emails, frequency of the emails, recipients, etc.

A user can also take a personality test to provide information. For example, the user can answer questions or take a standard test, such as the Myers Briggs Type Indicator (MBTI) test, the Minnesota Multiphasic Personality Inventory (MMPI) test, or one of various tests based on the Five Factor Model. Further tests include self-inventory type tests, observational measures, peer-report studies, and projective tests.

Obtaining information about a person also includes determining, collecting, receiving, gathering, obtaining, and/or retrieving verbal communication preferences, nonverbal communication preferences, and/or personal preferences of the person.

Consider an example in which a user agent and/or electronic device gather these preferences while the user communications with the user agent and/or electronic device. For example, a facial and emotional recognition system determines facial and body gestures of a user while the user communicates with the user agent and/or the electronic device. For instance, this system can utilize Principal Component Analysis with Eigenfaces, Linear Discriminate Analysis, 3D facial imaging techniques, emotion classification algorithms, Bayesian Reasoning, Support Vector Machines, K-Nearest Neighbor, neural networks, or a Hidden Markov Model. A machine learning classifier can be used to recognize an emotion of the user.

The user agent and/or the electronic device can recognize different features of a user in order to determine emotions of the user. Some of these features include neurological features (structural and functional imaging), visual or facial features (such as head movements, head positions, facial expressions, and eye movements), visual body features (such as body positions, body postures, and gestures), physiological features (such as heart rate, breathing rate, temperature, and blood pressure), voice features (such as changes in loudness or tone, frequencies, pitch, and rhythm), and linguistic features (such as semantics and emotional salience).

Preferences can include a person's personal likes and dislikes, opinions, traits, recommendations, priorities, tastes, subjective information, etc.

Block 210 states obtain and/or build a user agent with a personality based on the information about the person.

The user agent has a personality that emulates, copies, mimics, follows, and/or is similar to the personality of the person according to the information obtained about the person. For example, the user agent has similar or same emotions, attitudes, behavioral response patterns, mannerisms, appearance, personal preferences, opinions, verbal and nonverbal communication techniques, personality characteristics or traits, and/or habits as the person.

Building the user agent with the personality includes combining the verbal communication preferences, the nonverbal communication preferences, and the personal preferences of the person to create a personality of the person.

Various personality theories and models exist to assist in developing a user agent with a personality. The Big Five Factor is an example of one such model. This model includes five factors of extraversion (sociable and outgoing to reserved and shy), agreeableness (friendly and cooperative to antagonistic and competitive), conscientiousness (self-disciplined and organized to inefficient and careless), neuroticism (insecure and anxious to calm and unemotional), and openness (intellectual and insightful to unimaginative and closed minded).

The five factors of an individual with respect to actions, language, and/or behavior can be ranked, scored, and/or categorized based on each of the factors (such as extraversion versus introversion, agreeableness versus disagreeableness, conscientiousness versus conscienceless, emotional stability versus neuroticism, and openness versus reticence). Different scores for each of the factors can then be modeled into the user agent.

Block 220 states provide the user agent with the personality of the person to third parties or users.

The user agent executes on electronic devices owned by or accessible by users (such as consumers, purchasers, or third parties). These users are different individuals than the person on whom the personality of the user agent is based. Alternatively, the user of the user agent and the person on whom the personality is based can be the same person.

Consider an example in which a consumer purchases the user agent and/or an electronic device that includes the user agent. This user agent then runs on the electronic device of the consumer and/or on a server that communicates with the electronic device. For instance, the consumer purchases the user agent and downloads it to an HPED of the consumer. As another example, the user agent executes at a website (such as a social networking website) to which the user is a member. While the user is logged into the website or navigating the Internet as a member of the social networking website, the user agent executes for the user. As another example, the consumer decides to purchase a custom HPED (such as the consumer selecting hardware and software options for the HPED, and then having the HPED shipped to a residence of the consumer). The consumer selects an option to have a specific or custom user agent installed and included in the HPED.

The personality of the person is provided into a personality of a user agent that executes on an electronic device of a user.

Personality modeling and personification are two example techniques to incorporate a personality into a user agent. These techniques include, but are not limited to, physical appearance of the user agent (called physical personification), expressions and responses of the user agent (called logical personification), and personality and emotions of the user agent (called emotional personification). Modeling software programs can be used to incorporate these personifications into the user agent.

Consider an example in which the five factors are used to model a personality into a user agent. These factors can be modeled in different ways, such as modeling the factors as discrete categories or modeling the factors as coordinates in space (such as using an activation-evaluation space). Furthermore, expressions can be modeled using a Virtual Human Markup Language (VHML) or an Affective Presentation Markup Language (APML).

By way of example, the five factors are modeled into a user agent based on characterizations of verbal and nonverbal communication. Each factor (such as extraversion versus introversion) is defined according to actions, language, and/or behavior of the user agent in order to communicate or portray the given factor. For instance, the five traits are further divided into a plurality of categories with each category being defined with respect to verbal and nonverbal communication. An example list of categories includes one or more of adventurousness, ambition, anger, anxiety, arrogance, artistic, assertiveness, attentiveness, cautiousness, confidence, cooperativeness, depression, emotional, encouraging, excitability, friendliness, gregariousness, honesty and trust, imagination, initiative, intellect and reasoning, jealousy, modesty, morality and ethics, optimism, organization, risk aversion, selfishness, sympathy and empathy, and sincerity.

Consider an example in which extraversion versus introversion is further divided into categories of friendliness, attentiveness, initiative, gregariousness, assertiveness, excitement, and cheerfulness. Each of these categories is then defined according to actions, language, and/or behaviors that the user agent can exhibit to portray the category. For instance, a level or amount of friendliness (from being friendly to being cold) is shown with actions, language, and/or behavior with regard to subcategories of how much the user agent smiles, how much the user agent speaks amicably, how much the user agent has a sense of humor, how well the user agent greets people, etc. User agents with different scores within each category and subcategory will project a different personality to users based on projected auditory and visual information being conveyed from the user agent to the user.

A user agent can be assigned different preferences for each category, subcategory, and/or modality (with a modality representing a form of verbal and nonverbal communication). For instance, in order to specify that a user agent has a tendency to use head movements and postures during communication, a higher preference is assigned to these movements and postures.

Consider an example in which each category, subcategory, and/or modality is assigned a score or value (such as a value between 0 to 10) that represents a degree of preference. A value of 0 represents a strong aversion; a value of 5 represents neutrality; and a value of 10 represents a strong preference. The scores then represent the tendency of the user agent to utilize the feature being scored.

Behavioral expressions can also be modeled with other factors as well. For example, gestures and facial expressions can be modeled according to different parameters, such as a number of different modalities that simultaneously activate (e.g., simultaneously utilize eye movement, head movement, and a gesture to signify an expression), duration of movements, amplitude of movements, speed of movement, smoothness of movement, and number of repetitions.

Consider an example in which a celebrity takes one or more tests to determine his personal preferences and style of verbal and nonverbal communication preferences. These aspects of the celebrity are combined to replicate a personality of the celebrity, and this personality is implemented into an intelligent personal assistant. This intelligent personal assistant is then sold to or provided to users (such as consumers, purchasers, or third parties) such that the intelligent personal assistant executes on personal electronic devices of the users to assist the users in executing tasks. This intelligent personal assistant has a voice, an appearance (such as being an anthropomorphic agent), and mannerisms that emulate the voice, appearance, and mannerisms of the celebrity.

Consider an example in which a user purchases a user agent that executes on an electronic device. While the user interacts with the user agent, the user agent and/or electronic device captures facial and gesture expressions of the user.

These expressions are modeled as preferences that are compared to preferences of the user agent. The preferences of the user agent are changed or adjusted to match the preferences of the user. Verbal and nonverbal communication preferences with different emotions of the user agent match the verbal and nonverbal communication preferences with different emotions of the user. This adjusting can occur in real-time while the user interacts with the user agent. Over time, a personality of the user agent more closely matches a personality of the user since verbal and nonverbal communication preferences of the user agent are continuously, continually, or periodically changed to match the verbal and nonverbal communication preferences of the user.

As discussed herein, a personality of a user agent can be based on a living person, a deceased person, a fictitious person, numerous persons, or not based on any particular person or persons. When the personality of the user agent is based on a person, then the actions of the user agent reflect or mirror the personality of this person. For example, if the person on whom the personality is based has a friendly and outgoing demeanor, then the user agent will also have this personality. Further, when the user agent takes an action based on its personality, then this action is actually based on the personality of the person or persons on whom the personality of the user agent is based. For example, if the person on whom the personality is based prefers baseball, French history, and Thai food, then the user agent will also have these preferences. When the user agent performs or executes tasks for its user, these tasks can be based on the personality of the user agent that is based on another person, different than the user. Example embodiments discussed herein give various examples of tasks actions that the user agent executes for or on behalf of the user.

Block 230 states obtain updated information about the person.

The information about the person (per block 200) is updated or changed. For example, after the user agent is built with the personality, new and/or additional information about and/or from the person is collected, received, gathered, obtained, and/or retrieved. This new and/or additional information is in addition to the information previously obtained per block 200.

Consider an example in which a person takes a personality test (such as a test of Carl Jung and/or Myers Briggs) to assist in determining a personality of this person. A personality of a user agent is subsequently based on the personality of this person, and this user agent is sold to or provided to consumers. Later, the person provides additional information or additional information is obtained that further assists in qualifying, clarifying, deleting from, changing, or adding to the personality previously created. This additional information is used to update the previous information about the person and/or the personality of the person.

Block 240 states change and/or modify the personality of the user agent based on the updated information obtained about the person. The updated and/or additional information about the person is used to update, change, and/or modify the personality of the user.

Block 250 states provide the changed and/or modified personality of the user agent to the users that previously acquired the user agent.

Consider an example in which a celebrity provides personal information in order to assist a company in developing a user agent with a personality that is modeled on the celebrity. Consumers purchase the user agent so they can have a user agent with the personality of the celebrity execute on or accessibly by their electronic devices. After these user agents are provided to the consumers, new information about the personality of the celebrity is collected. For example, as the celebrity interacts with his electronic devices, his user profile is updated. These updates provide additional information about the personality of the celebrity. This additional information is provided to the company in order to modify or adjust the personality of the user agent. Modifications to the personality of the user agent are then provided to the consumers who previously purchased or obtained the user agent with the personality of the celebrity. Thus, consumers have a user agent with a personality that repeatedly or continuously evolves or changes over time. As personal traits or preferences of the celebrity change, these changes are passed to the consumers that purchased this personality. Furthermore, such changes can be passed to the personality of the user agents in real-time as the additional information is collected. As such, consumers have a personality of a user agent that emulates the current personality of the celebrity. As preferences of the celebrity change, the corresponding preferences of the user agents change.

Modifications to the personality can be obtained and/or provided continuously, continually, periodically, or based on changes to the personality of the person. Consider an example in which the person on whom the personality is based travels to Southeast Asia. During this trip, the person discovers that she likes Vietnamese food and some other cuisines about which she previously did not have an opinion. Her food preferences are changed to capture changes to her tastes in food. In this example, she realizes that she is fond of Vietnamese food. Since these food preferences define part of her personality, the preferences are provided as updates to user agents that are based on her personality.

Consider an example in which the personality of the user agent is based on a person named John Smith. This user agent is made available to the public and provided on electronic devices of users. John Smith also executes this user agent on his HPED (i.e., he executes a user agent with a personality that is based on himself). This user agent emulates the personality of John Smith. While the user agent of John Smith executes on his HPED, it continues to gather personal information about John Smith. As this user agent gathers new information about John Smith, the user agent adapts or changes its personality to more accurately emulate the personality of John Smith. As this new information is gathered, it is also provided to the other users of the public that execute the user agent of John Smith. As such, the personalities of the user agents of the users grow and change as the personality of John Smith grows and changes. Furthermore, these modifications can be provided in real-time to the users when the modifications are collected. For instance, the user agent of John Smith determines a new personality trait, preference, or modification to the personality of John Smith and immediately transmits these over a network to electronic devices having user agents that execute the personality of John Smith.

Thus, the personality of the user agent evolves as the personality of the person evolves. Changes to the personality of the person are captured, and then these changes are included into the personality of the user agent. These changes can be transferred to other users or user agents in real-time or simultaneously as the information is gathered.

In an example embodiment, the updates and/or changes to the personality of the user agent are distinguished from a software update or software patch. A software update or a software patch is a piece of software that updates a computer program or fixes problems with the program or its supporting data. For example, a personality of a user agent is updated with information regarding a change to a personality of the person, such as new information regarding how the person gesticulates, how the person verbally communicates, or personal preferences of the person. These updates enable the user agent to more closely approximate the personality of the person. The update to the personality can be provided without also providing a software update or software patch.

Figure 3:
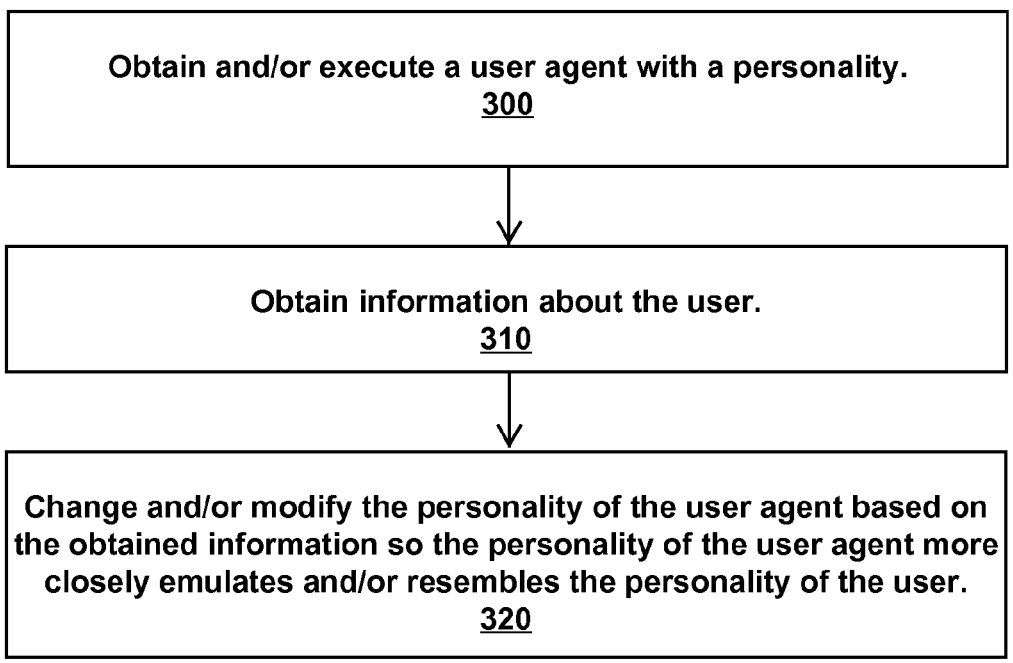
FIG. 3 is a method to modify a personality of a user agent in order to emulate a personality of a user using the user agent in accordance with an example embodiment.

FIG. 3 is a method to modify a personality of a user agent in order to emulate a personality of a user using the user agent.

Block 300 states obtain and/or execute a user agent with a personality.

The user agent can execute on an electronic device that the user owns (such as the user agent being downloaded to or provided with the electronic device of the user agent). The user agent can also execute on an electronic device that is in communication with an electronic device of the user. For instance, a server and/or a website provides the user agent with the personality that is available to the user when the user navigates to the website and/or logs into a mobile application.

Block 310 states obtain information about the user. For example, the information about and/or from the user is collected, received, gathered, obtained, and/or retrieved as discussed in block 200 or with methods discussed herein.

Block 320 states change and/or modify the personality of the user agent based on the obtained information so the personality of the user agent more closely emulates and/or resembles the personality of the user.

Consider an example in which a mobile application downloads to an HPED of a user. This mobile application presents multiple user agents that each have a different personality. The HPED or the user selects one of these user agents that have a personality that most closely resembles a personality of the user. This selected user agent then executes on the HPED. The mobile application then collects information about the user as the user interacts with the HPED. For instance, this information includes information that relates to the personality of the user (such as personal preferences of the user, habits of the user, and verbal and nonverbal communication patterns and techniques of the user). This information is used to change and/or modify the personality of the user agent to be more similar to the personality of the user.

Consider an example in which a user is a member of a social networking website (such as FACEBOOK). This social networking website has a user profile of the user since the user is already a member. Information from this user profile is used to select a preexisting user agent that has a personality similar to a personality of the user. The personality of the user is determined from an analysis of the information in the user profile. Based on this information, a user agent with a personality similar to a personality of the user is built and/or selected. Thereafter, as the user continues to interact with the social networking website, the user profile is further updated with newly collected information. This information includes traits, characteristics, and/or personal preferences of the user. These traits, characteristics, and/or personal preferences are applied to the personality of the user agent so the user agent has a personality that more closely resembles a real personality of the user.

Over time, the personality of the user agent more and more closely resembles the personality of the user since personal information about the user continues to be received, gathered, obtained, and/or analyzed and then transferred to the personality of the user agent.

Consider an example in which the user uses body and head gestures or positions to signify an emotion. By way of illustration, some example head positions include a raised head position with the chin jutting forward (example to signify superiority, power, or aggression), a tilted head position to one side (example to signify submission or non-threatening), a head down position (example to signify negative, disapproval, or judgmental attitude), or a head shrug movement (example to signify submission or indecisiveness). A tone of a user's voice and content of verbal communication can support one or more of these head position meanings. A determination is made that the user uses one or more of these head positions to convey an emotion. These head positions are then transferred to the personality of the user agent. As such, the user agent will also use head positions and/or movements to convey the emotion that the user associates with the head positions and/or movements. For instance, if the user shrugs his shoulders and slightly turns his head to signify indecisiveness, then the user agent will also shrug his shoulders and slightly turn his head to indicate indecisiveness.

Figure 4:
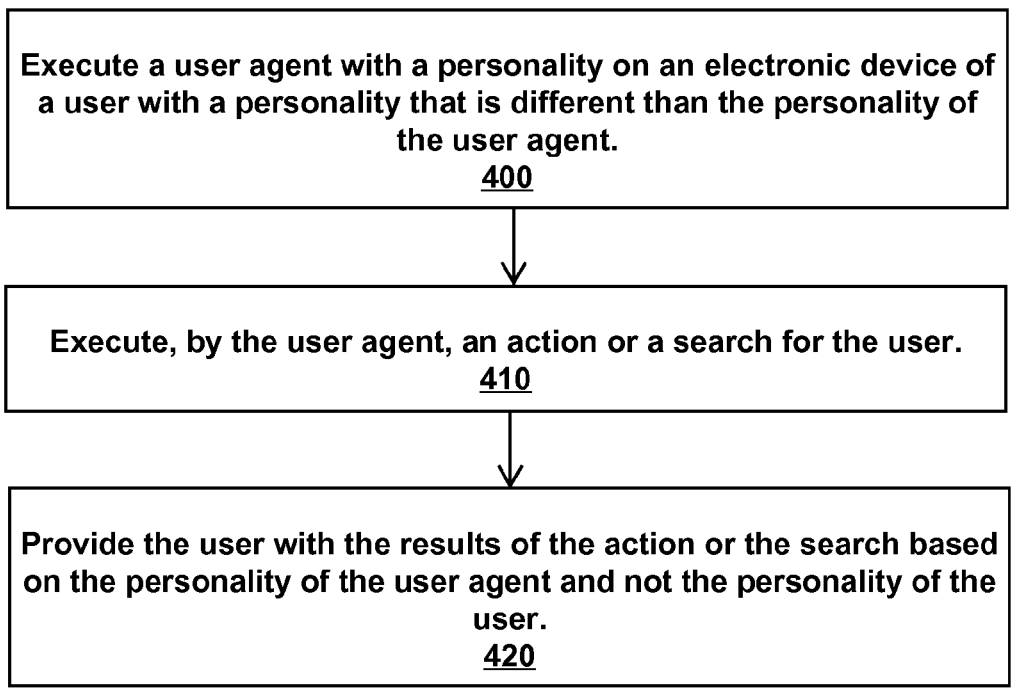
FIG. 4 is a method to execute an instruction and/or search based on a personality of a user agent in accordance with an example embodiment.

FIG. 4 is a method to execute an instruction and/or search based on a personality of a user agent.

Block 400 states execute a user agent with a personality on an electronic device of a user with a personality that is different than the personality of the user agent.

The personality of the user agent is different and/or distinct from the personality of the user, and the personality of the user agent can be based on another person. The user can interact with the user agent via the electronic device (such as communication with a natural language user interface, NLUI). Further, this user agent can execute on the electronic device (such as being downloaded to the electronic device) or communicate with the electronic device (such as executing on a server that communicates with the electronic device).

Block 410 states execute, by the user agent, an action or a search for the user.

The user can provide an action or search request directly to the user agent (such as speaking instructions to the user agent to perform an action or perform a search engine search). Alternatively, the user agent can perform the action or search on behalf of the user without a direct request. For instance, the user agent performs a pre-emptive action or a pre-emptive search for the user (i.e., performing an action or search before it is actually requested). A pre-emptive action or search can be based on a prediction or likelihood that the user will want the information in the future. As another example, the user agent performs task on a routine or daily basis (such as recommending or assisting in obtaining dinner each night for the user).

The action or search is executed based on the personality of the user agent, as opposed to the personality of the user that can be quite different than the personality of the user agent. Information that forms the personality of the user agent provides a basis for execution of the action or search. This information can include personal preferences, opinions, preferences with regard to verbal and/or nonverbal communication, and other aspects that form the personality of the user agent.

Consider an example in which a user requests a search for banks. This term has several meanings (such as a financial institution, a slope of land, a cushion shot in billiards, or an incline). Since the user agent has an expertise in finance and personal preferences for financial systems, the term is interpreted as being a financial institute, as opposed to the other interpretations. This interpretation is based on the personal preferences of the user agent, and not the personal preferences of the user.

Consider another example in which the user requests an Internet search for buying an oven. The user agent already has a preference or bias toward an aspect of the search, such as a preference for a store where to buy the oven, a type of oven, a make or model of an oven, a particular company that sells the oven, a website that sells ovens, an advertisement for an oven, information about ovens, prices for ovens, quality of ovens, etc. The search is executed on a web search engine based on one or more of these preferences that form part of the personality of the user agent. Further, the user may have no preference information regarding ovens so the search is executed based on preference information of the user agent. Alternatively, the search may be based on preferences from both the user agent and the user.

Consider an example in which the user initiates a query that includes several keywords. A relevancy and interpretation of these keywords are based on information in a personal profile of the user agent, as opposed to information in a personal profile of the user.

Consider another example in which a user would like to know more information about the topic of geological processes. The user has little knowledge about this subject and has no preferences. This topic has a wide range of subtopics, such as erosion, geochemistry, geological mapping, sedimentation, plate tectonics, rock formation, and soil chemistry. The user agent is based on a person that has a personal preference to plate tectonic, and this preference is used in executing the search for geological processes.

Consider an example in which a user agent of a user determines that a desktop of a user is cluttered with icons and other items. The user agent on his own initiative, without receiving instructions from the user, decides to rearrange, organize, and cleanup the desktop for the user. Items on the desktop are removed, added, and rearranged according to preferences or likes of the user agent.

Consider an example in which a user requests his user agent to perform a keyword search. A personal preference of the user indicates a preference for YAHOO web search engine, whereas a personal preference of the user agent (which is based on a celebrity) indicates a preference for GOOGLE search engine. The user agent selects GOOGLE as the search engine since the user agent has a preference for this search engine.

Block 420 states provide the user with the results of the action or search based on the personality of the user agent and not the personality of the user.

After the search is executed, results for the action or search are provided based on a bias or preference to information that forms the personality of the user agent (as opposed to a bias or preference to information that forms the personality of the user). For example, search results are ordered based on information included in a personality of the user agent as opposed to information included in a personality of the user even though the user agent and the user having different personalities.

Consider an example in which a user receives numerous advertisements for display on an HPED of the user. A user agent of the user filters and/or removes some of these advertisements based on personal preferences of the user agent. The filtered advertisements are not displayed to the user, and the user is unaware that they were removed.

Consider an example in which a search engine performs a search in response to a keyword query. Results to this search are displayed as a search engine results page (SERP) that includes a list of items with titles, a reference to the full version, and a short description indicating where the keywords match content in the corresponding web page. An order of this list is based on a personality or personal preferences of the user agent as opposed to a personality or personal preferences of the user. For instance, if the user agent prefers AMAZON over BARNES & NOBLES, then search results to AMAZON are prioritized.

Consider an example in which a user wants to eat dinner and asks the user agent for a list of restaurants on the East side of Cleveland. Since the user agent is based on persons that have a preference toward Italian food, Italian restaurants are given a higher priority than other types of restaurants. The user agent provides the user with a list of restaurants on the East side of Cleveland, and this list is weighted toward Italian restaurants. This recommendation occurs even though the user may have a preference in his user profile to Mexican food.

Consider an example in which a user asks the user agent to play selections of jazz music for the user. The user agent has a preference for cool jazz and selects tracks from Miles Davis and John Coltrane.

Consider an example in which a user asks the user agent to research televisions and provide a recommendation on which television to buy. Several companies make competing televisions that are very good, and a recommendation as to which one to buy includes some subjectivity or opinion. The user agent has a slight preference or partiality to PANASONIC and thus recommends this company.

The results of the query or search being based on the personality of the user agent and not the personality of the user extend beyond personal preferences of the user agent and include verbal and nonverbal communication preferences. Thus, the user agent can use verbal and/or nonverbal communication preferences to provide search results.

Consider an example in which the user asks the user agent to explain the differences between the Conservative and Unionist Party and the Labour Party that operate in the House of Commons in Great Britain. The user agent has a preference for the Labour Party and a slight aversion for the Conservative and Unionist Party. The user agent does provide complete and accurate information to the user regarding these two parties. While talking to the user and explaining the differences between these two parties, however, the user agent uses gestures and facial expressions that indicate a slight preference to the Labour Party. The user agent also selects words and uses a tone showing a slight deference to the Labour Party.

Consider another example in which a user has an HPED with a user agent. The user instructs his user agent to wake the user each morning at 8:00 a.m. This user agent has a cheerful personality in the morning. Each morning the user agent speaks in a cheerful manner through the HPED to wake the user.

Figure 5:
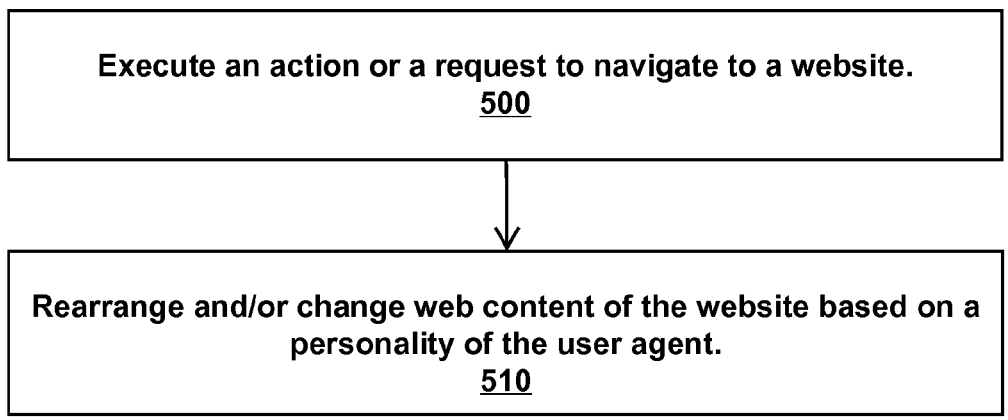
FIG. 5 is a method to rearrange a page layout of a website to match a personality of a user agent in accordance with an example embodiment.

FIG. 5 is a method to rearrange a page layout of a website to match a personality of a user agent.

Block 500 states execute an action or request to navigate to a website.

A user can initiate a command or request for an electronic device to navigate to particular website. Alternatively, the electronic device or a user agent that executes with the electronic device can perform an action of navigating to the website with or without a request from the user.

Block 510 states rearrange and/or change web content of the website based on a personality of the user agent.

The web content of a website or webpage includes visual and/or aural content. By way of example, the web content can include one or more of hyperlinks, interactive elements, multimedia, text, audio, animations, video, buttons, forms, boxes, advertisements, applications, images (such as static and animated images), color-schemes, typographic information, email, data, and other web content. Further, changing web content includes rearranging or changing a page layout and/or style of content that is being presented.

Dynamic web pages include web content that varies or changes based on parameters provided by a computer program or user, such as an electronic device and/or a user agent. Web content changers can change the content and/or layout of web pages. By way of example, client-side scripting and/or server-side scripting can dynamically change content at a web page. For instance, a program executing on a server can change content on a web page or adjust a sequence of items displayed on the web page. As another example, a web development technique (such as Ajax) sends requests to a server for data, and the server returns the requested data that a client-side script formats. As another example, responsive web design changes a layout of the web page by using proportion-based grids and flexible images. As yet another example, dynamic web templates assist in changing web pages.

Consider an example in which a user agent has a personality that prefers a text color of black and background colors of green, blue, and gold. When a user navigates to a dynamic webpage, these preferences of the user agent are retrieved and provided to a server of the webpage. The server then alters the text and background colors of the webpage to these preferred colors and presents the altered web page to the user. Thus, the webpage is altered based on preferences of the user agent as opposed to preferences of the user. In this instance, the user may have difference color preferences than the user agent (such as the user prefers a text color of blue and background colors of white and green).

Consider an example in which a user belongs to a social networking website (such as FACEBOOK) and has an HPED that includes an intelligent user agent with a personality. The user navigates with his HPED to his social networking web page that includes a news web feed or a syndicated feed. This news web feeds retrieves and orders news articles based on the personality of the user agent and not on the personality or web history of the user. For instance, the personality of the user agent includes preferences for news about Latin America, so news feeds with this topic are given priority for display on the social networking web page of the user.

Consider an example in which a user belongs to a social networking website. The user purchases an intelligent personal assistant that has a personality based on a famous professional athlete. The user agrees to allow his social networking webpage to automatically change its layout based on the personality of the professional athlete. Currently, a layout of the social networking webpage of the user is based on preferences of the user and/or input from the user (such as the user selecting which content appears, moving boxes and content to preferred locations, dragging and dropping icons or windows or boxes to preferred locations, etc.). When the user logs into his social networking webpage, the page layout of this webpage is automatically rearranged or changed to match the personal preferences of the professional athlete that are included in the personality of the user agent. By way of example, these changes include one or more of changing web content (such as changing news feeds or an order of articles) and moving, deleting, and/or adding web content (such as indexes, product descriptions, testimonials, reviews, articles, advertisements, resources, news, topical discussions, downloads, frequently asked questions (FAQs), contact information, site maps, policies, agreements, blog content, profiles, pictures, videos, directory listings, etc.).

Consider an example in which a user instructs his user agent via natural language communication to navigate to a news website (such as CNN) that has a general or standard page layout that is displayed to users. News articles and stories, headings, windows, links, and advertisements are moved, changed, added, and/or deleted to generate a personalized webpage based on preferences of the user agent. For example, the user agent prefers the sports of football and basketball so stories and windows for these sports are prioritized and moved to a top of the webpage. As another example, the user agent prefers technology and travel articles and does not care for business news. Articles relating to technology and travel are retrieved and prioritized over other articles, and business news is deleted or moved to a lower priority, such as to a bottom of the webpage. As another example, the user agent is interested in cars and motorcycles, so advertisements to these products are presented. As another example, music at the news website changes to play preferences of the user agent. As such, when the user navigates to CNN, the user views web content and a page layout that is unique and based on the personality of the user agent.

Figure 6:
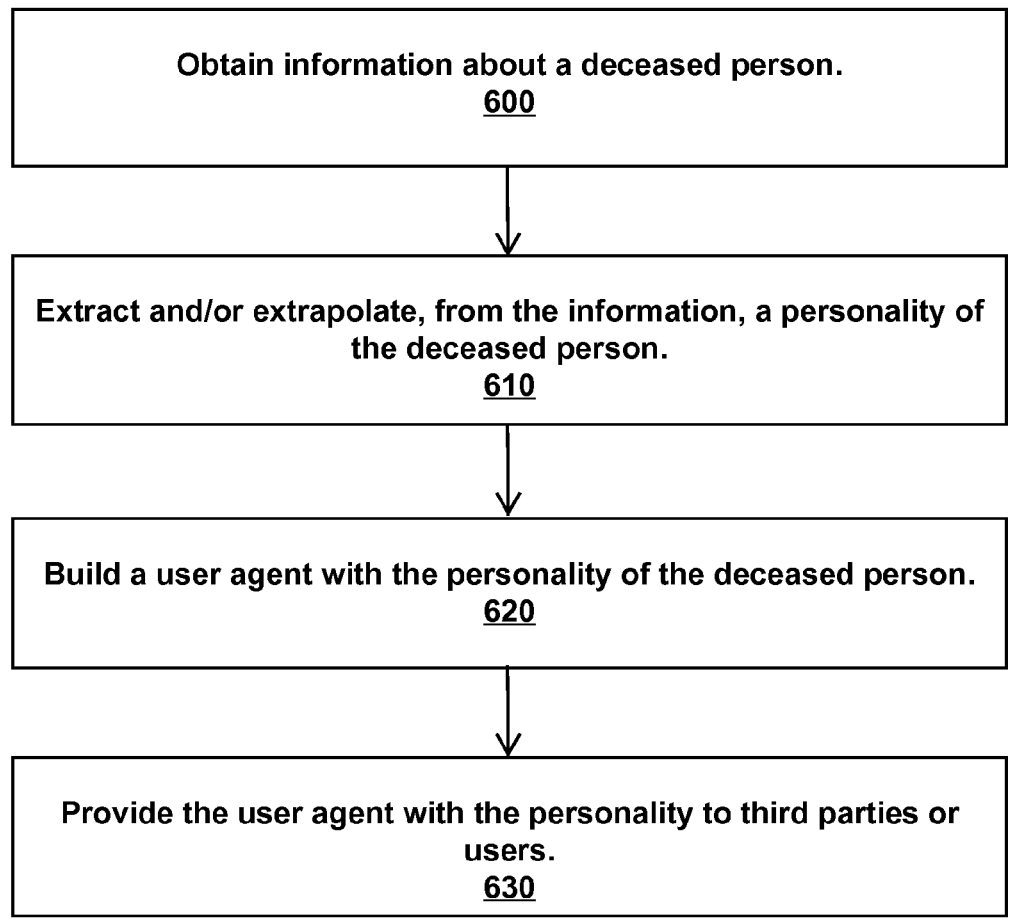
FIG. 6 is a method to develop a user agent with a personality that is based on a deceased person in accordance with an example embodiment.

FIG. 6 is a method to develop a user agent with a personality that is based on a deceased person.

Block 600 states obtain information about a deceased person.

For example, the information about the deceased person is collected, received, gathered, obtained, and/or retrieved. This information includes one or more of public information, private information, semi-private (information having some degree of privacy but not fully private), and semi-public (available to a portion, but not all, of the public).

Information can be obtained from public records, private records, books, newspapers, magazines, Internet, journals, letters, videos, interviews, other persons (such as family, friends, coworkers, witnesses, acquaintances, etc.), interests of the deceased person, influences on the deceased person, timelines, patterns, paintings, accomplishments of the deceased person, chronology of a life of the deceased person, places significant to the deceased person's life, biographies, autobiographies, articles, pictures, writings, sound recordings, tests, examinations, questions, conversations, observations, a user profile, etc.

Block 610 states extract and/or extrapolate, from the information, a personality of the deceased person.

A personality of the deceased person can be inferred, predicted, extracted, extrapolated, determined, generated, and/or obtained from the information. For instance, this information can include data with regard to personal preferences of the deceased person, verbal and nonverbal communication preferences or techniques of the deceased person, and characteristics or traits of the deceased person. For instance, even if the deceased person did not take a personality test, information collected about the person can be used to predict or infer how the deceased person would have answered questions on such a test. Results to the test can be used to determine the personality of the deceased person.

By way of example, information collected about the deceased person includes one or more of videos showing how the deceased person nonverbally communicated (such as gestures, body language, and facial expressions), audio showing how the deceased person verbally communicated (such as word choices, enunciation, writing style, tone, pauses, emphasis, and loudness), and video and pictures showing what the person looked like and how the person dressed. This collected information could also show personal preferences with regard to topics such as music, food, business, art, theater, movies, dance, politics, culture, entertainment, travel, leisure, etc.

Block 620 states build a user agent with the personality of the deceased person. A personality of the deceased person is built based on the information extracted and/or extrapolated. Block 210 and methods herein discuss and give examples for building a user agent with a personality.

Block 630 states provide the user agent with the personality to third parties or users. The user agent executes on electronic devices owned by users (such as consumers, purchasers, or third parties) or is accessible by users (such as at a website or on a server).

Consider an example in which a user agent is built based on a personality of a deceased historical figure (such as Franklin Delano Roosevelt or Martin Luther King Jr.). Information about the historical figure is collected and then analyzed to determine a personality of the deceased individual. This personality is then built into an intelligent anthropomorphic user agent that is sold to consumers.

Figure 7:
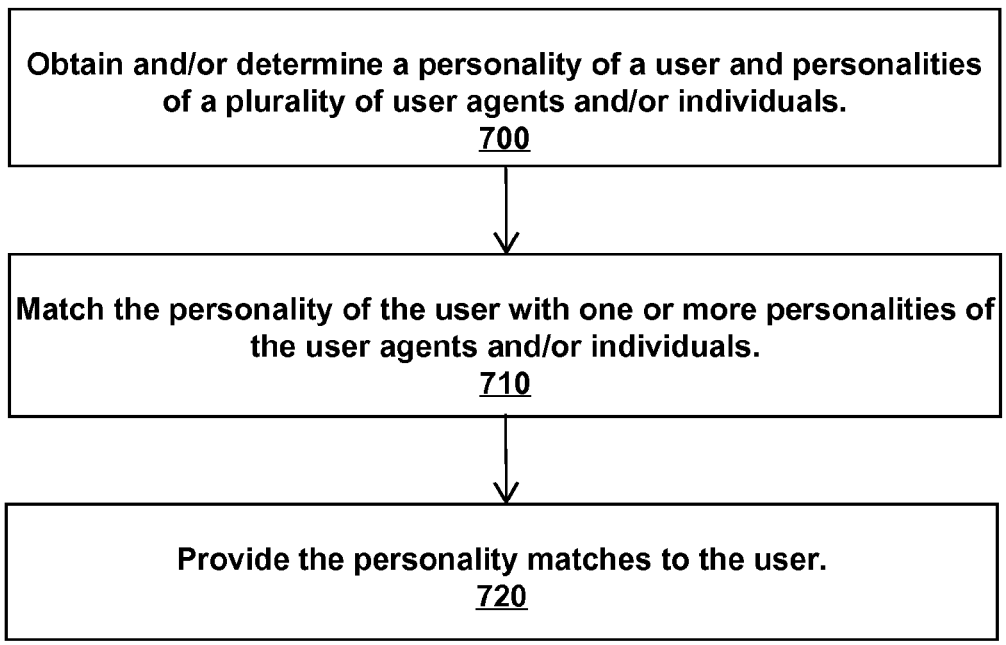
FIG. 7 is a method to match a personality of a user with a personality of a user agent in accordance with an example embodiment.

FIG. 7 is a method to match a personality of a user with a personality of a user agent.

Block 700 states obtain and/or determine a personality of a user and personalities of a plurality of user agents and/or individuals. These personalities can be determined in accordance with methods and blocks discussed herein.

The personalities of the user agents or individuals can emulate or be based on living persons or deceased persons (such as famous historical or living individuals). These personalities also include fabricated personalities or other personalities.

Block 710 states match the personality of the user with one or more personalities of the user agents and/or individuals.

By way of example, the personality of the user is matched with one or more personalities of the user agents or individuals using weighted attributes, predictive modeling, models utilizing classifiers, and mathematical models.

Consider an example in which the personalities are divided into the Big Five personality traits (i.e., openness, conscientiousness, extraversion, agreeableness, and neuroticism). These five traits are further divided into numerous subcategories and scored or characterized. Scores or characterizations from the user and the different user agents or individuals are compared to determine a match. For instance, a match occurs when the personality of the user is similar to a personality of an individual. By way of illustration, a personality of user may be most similar to a personality of Abraham Lincoln and this similarity causes a match. This instance may occur when the user desires to have a user agent with a similar personality of the user. Alternatively, a match occurs when the personality of the individual fills voids exhibited by the personality of the user. For instance, if the personality of the user is characterized as anxious, lax, and close-minded, then this user may match well with an individual having opposite characteristics, such as a personality that is cooperative, outgoing, calm, and organized. As another example, a user may match well with a personality of an individual or existing user agent that has positive attributes along four of the five dimensions and a negative attribute along one of the dimensions. For instance, the user finds it easier to communicate and identify with a user agent having a personality with a specific weakness or flaw.

Users can also be matched with multiple different user agents with each user agent having a different personality. For example, the user is matched with a personality of a user agent having a specialty in music, a personality of a user agent having a specialty in finance, and a personality of a user agent having a specialty in health. These three different personalities execute on the electronic device of the user and/or assist the user in performing tasks.

Consider an example in which a user is determined to have a Myers-Briggs Type Indicator (MBTI) of ISTP (introverted, sensing, thinking, perceiving). This user is matched with living and deceased individuals who also have an MBTI of ISTP. Alternatively, the user is matched with other MBTI personalities that are compatible with the MBTI of the user. For instance, if the user has an MBTI of ISTJ, then the user is matched with a user agent or individual having an ESTJ, INTJ, ISTP, or ESTP personality type since these are deemed compatible with the personality of the user.

Block 720 states provide the personality matches to the user.

The user agents and/or individuals that matched the personality of the user are provided to the user. For example, the matches are recommended, saved, emailed, displayed, transmitted, and/or provided to the user. The user can then make a decision, such as selecting, purchasing, and/or executing one or more of the user agents. As another example, matches between the user and the individuals are automatically implemented as user agents for the user. For instance, the user selects a personality based on a living individual, and a user agent with this selected personality is built and provided to the user. The user then purchases this personality and/or a user agent with this personality.

Consider an example in which the user wants to purchase a user agent with a personality, but the user is not sure which type of personality would best suit the user. The user would like to have a user agent with a personality that is based on a famous living or deceased person. A determination is made of the personality of the user, and this determination is used to select compatible personalities of famous living and deceased persons. A list of these persons is presented to the user. The user selects one of these persons, and a user agent with this selected personality is sold to the user.

Figure 8:
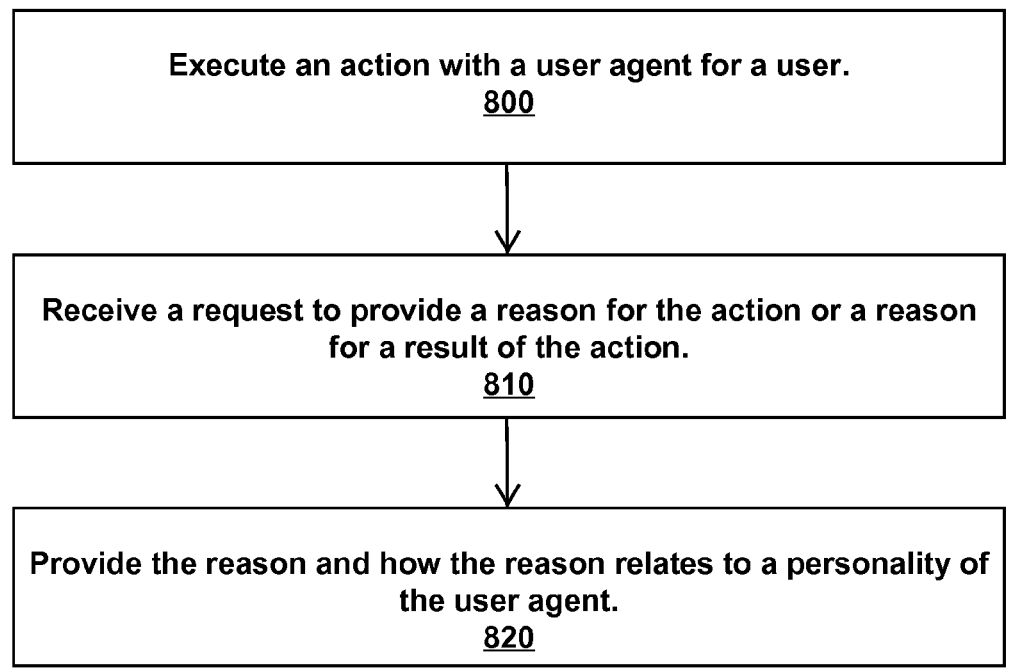
FIG. 8 is a method to receive a reason for an action from a user agent in accordance with an example embodiment.

FIG. 8 is a method to receive a reason for an action from a user agent.

Block 800 states execute an action with a user agent for a user.

The user agent can receive a request from the user to perform an action (such as the user asking the user agent to perform a search, navigate to a website, provide a recommendation or opinion, retrieve a document, or perform another action). Alternatively, the user agent can perform these action or others without a direct request from the user (such as performing a pre-emptive action).

Block 810 states receive a request to provide a reason for the action or a reason for a result of the action.

For example, before, during, or after execution of the action, the user asks the user agent for a basis for the action, a cause for the action, or reason for a result of the action. For instance, the user requests a justification or explanation for the action that the user agent executed.

Block 820 states provides the reason and how the reason relates to a personality of the user agent.

The user agent provides a basis or cause for the action as it relates to the personality of the user agent. Results of the action or the action itself can relate to or be based on, at least in part, the personality of the user agent. For instance, the personality of the user agent affected the action or the result, and the user requests an explanation as to how the personality affected the action or the result.

Consider an example in which the user and the user agent are communicating back and forth about the topic of music from the Classical period. During this discussion, gestures and language of the user agent become noticeably pronounced. The user asks the user agent: "Why are you so enthusiastic with this conversation?" The user agent replies: "Because I have a deep love for the arts and especially for musical composers from the Classical period in the $18^{th}$ century." Thus, the user agent provided a reason based on his personality.

Consider an example in which a user agent automatically reorders boxes or windows that appear on a social networking website of the user. Specifically, news and finance articles are moved toward a top of the website while sports and entertainment articles are moved away from the top. While visiting the newly organized website for the first time, the user pauses and stares at the website with a puzzled look. The user agent offers a verbal response: "Given the importance of news and finance to both of us, I moved these items to the top of the page for you." Here, the user agent provides a justification for the move based in part on personal preferences of both the user and the user agent.

A justification or reason for taking an action can provide information about the personality of the user agent. Consider an example in which a user purchases a user agent with a personality that is based on a famous historical figure (such as Albert Einstein). After working on his computer while in his house, the user decides to take a break and relax. In response to this break, user agent Einstein plays a Mozart violin sonata over speakers in the house. User agent Einstein informs the user: "I started playing the violin when I was a young boy and was inspired by Mozart. Enjoy this sonata." Here, the user agent provides a reason for his action and also provides factual information about the life of Albert Einstein on whom the personality of the user agent is based.

Figure 9:
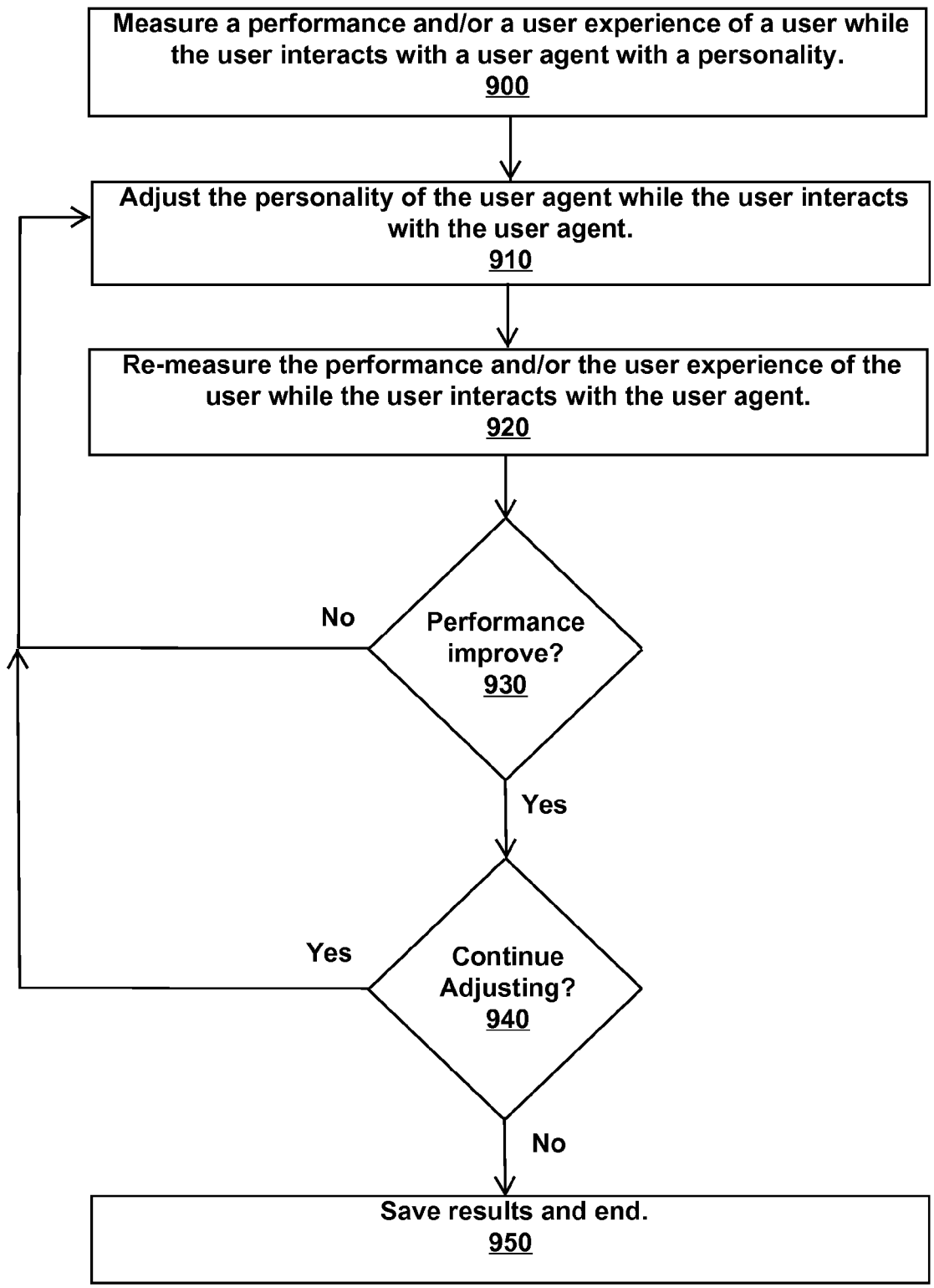
FIG. 9 is a method to adjust a personality of a user agent while a user interacts with the user agent in accordance with an example embodiment.

FIG. 9 is a method to adjust a personality of a user agent while a user interacts with the user agent.

Block 900 states measure a performance and/or a user experience of a user while the user interacts with a user agent with a personality.

Performance includes accomplishments and/or measurements of a given task measured against known standards, accuracy, completeness, cost, and/or speed. Performance measurement includes collecting, analyzing, and/or reporting information regarding the performance of a user and/or system (including user agents). Performance measurement estimates and compares parameters under which users and systems reach or achieve targeted results. By way of example, performance measurement can include measuring throughput, accuracy, interaction, activity, responsiveness, response time, attention span, length of time, and improvement.

User experience relates to the encounter of the user with the system and the user agent during a time period. This experience includes emotions of the user during the encounter, perceptions of the user during the encounter, responses that result from the experience, and interpretations of these perceptions during the encounter. By way of further example, user experience includes subjective reporting from the user about the experience (e.g., through a questionnaire or interviews), think-aloud techniques, video and audio to record gestures, body language, verbal output, and other verbal and non-verbal generated output, physiological responses and measures (heart rate, blood pressure, body temperature, electromyography, breathing, etc.), emotions (such as positive affect negative affect, frustration, happiness, surprise, respect, etc.), beliefs, preferences, perceptions, physical responses, etc.

Measuring performance and user experience also includes statistical modeling, psychophysiological and emotional measurements, questionnaires, interviews, expression monitoring, think-aloud protocol, experience sampling methods, and/or retrospective verbal self-reports.

Block 910 states adjust the personality of the user agent while the user interacts with the user agent.

One or more of the characteristics, traits, preferences, categories, etc. of the personality of the user agent are changed, deleted, and/or added (such as a verbal communication technique, a nonverbal communication technique, responses to the user, interaction with the user, and/or a personal preference of the user agent).

Block 920 states re-measure a performance and/or a user experience of the user while the user interacts with the user agent.

After an adjustment to the personality of the user agent, the performance and/or the user experience are measured again.

Block 930 makes a determination as to whether an improvement exists in the performance and/or the user experience of the user. If the answer to this determination is "no" then flow proceeds back to block 910. If the answer to this determination is "yes" then flow proceeds to block 940.

Block 940 makes a determination as to whether to continue adjusting and the measuring performance and/or the user experience. If the answer to this determination is "no" then flow proceeds to block 950 wherein results are saved and flow ends. If the answer to this determination is "yes" then flow proceeds back to block 910.

Consider an example in which a user interacts with a user agent and a graphical user interface (GUI) of an electronic device during a simulation in order to navigate a vehicle and/or weapon, select targets, and destroy targets. The user agent assists the user in performing these tasks. Personality settings of the user agent during a first sequence of simulations result in a ninety percent (90%) accuracy score for the user. During the simulation, adjustments are made to a personality of the user agent in order to improve performance of the user (such as improving the speed and the accuracy at which targets are selected and destroyed). These personality settings are modified to make the user agent slightly more secure, aggressive, friendly, and authoritative. After the adjustments, a second sequence of simulations is performed. Personality settings of the user agent during this second sequence of simulations result in a ninety percent (92%) accuracy score for the user. These personality settings are saved and matched to the user.

Consider an example in which a student interacts with a user agent to receive tutoring from the user agent for mathematics. During the tutoring sessions, a personality of the user agent is repeatedly changed in order to find an optimal set of user agent parameters for the student. Facial expressions, sounds, and gestures of the student are recorded and analyzed. Additionally, performance of the student with regard to answering math questions is also recorded and analyzed. The personality of the user agent is changed in real-time while the student is receiving tutoring from the user agent. Based on this user experience and performance measurements and analysis, optimal settings are obtained for the student. These optimal settings provide a highest rate of comprehending, learning, and applying mathematics for the student. When the student subsequently logs into the computer system, the user agent with these settings is retrieved to tutor the student.

Figure 10:
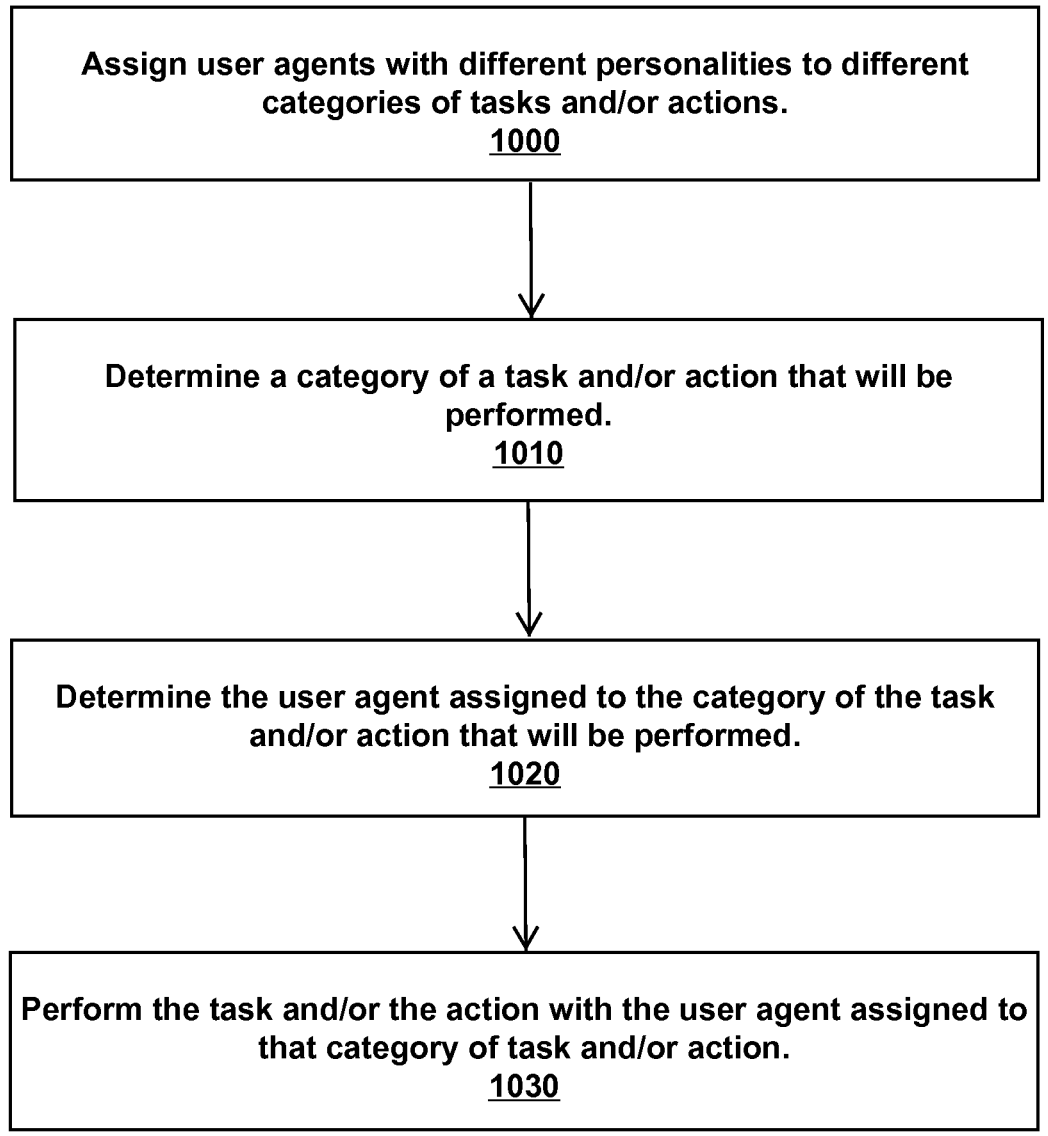
FIG. 10 is a method to perform a task and/or an action with a user agent assigned to a category of the task and/or the action in accordance with an example embodiment.

FIG. 10 is a method to perform a task and/or an action with a user agent assigned to a category of the task and/or the action.

Block 1000 states assign user agents with different personalities to different categories of tasks and/or actions.

By way of example, user agents can be assigned different categories based on input from a user. For instance, a user assigns a first user agent to execute tasks or actions associated with or related to politics, news, and money. The user assigns a second user agent to execute tasks or actions associated with religion, art, health, and spiritual awareness. The first and second user agents have distinct and different personalities.

User agents can also be assigned different categories based on input from an electronic device and/or software program. For instance, when a user joins a social networking website, a software program that executes for the website assigns a user agent to the user. Additionally, when users navigate to different network locations from the social networking website, the program assigns a user agent to users based on what links are activated or based on to where the users navigate. For instance, when users click on a financial link, they are assigned a financial advisor user agent. When these users click on a sports link, they are assigned a sports advisor user agent.

Block 1010 states determine a category of a task and/or action that will be performed.

By way of example, when an electronic device receives a task and/or an action to execute, a determination is made as to whether this task and/or action is assigned to or belongs to a specified category. For instance, a user requests a GOOGLE search, and a determination is made that search engine queries are assigned to a first predetermined user agent. As another example, the user navigates to a social networking website of the user, and a determination is made that news articles displayed at this website are altered in accordance with preferences of a second predetermined user agent.

Categories can be determined based on the content of information being requested or provided. For instance, when a user navigates to a website that provides information about sports or activates a hyperlink to a story about sports, the category is sports. Additionally, the information being retrieved and/or provided can be searched for keywords to determine a match with categories.

Block 1020 states determine the user agent assigned to the category of the task and/or the action that will be performed.

User agents with different personalities and/or different specialties are assigned to different categories. For example, a Myers-Briggs Type Indicator (MBTI) personality type of ENFJ (extroverted, intuitive, feeling, judging) is assigned as a spiritual or religious user agent, and a MBTI personality type of INTP (introverted, intuition, thinking, perception) is assigned as a business analysis user agent.

Block 1030 states perform the task and/or the action with the user agent assigned to that category task and/or action.

Consider an example in which a user purchases different anthropomorphic user agents with different personalities that execute on or in conjunction with an HPED of the user. For instance, a first user agent is based on a personality of a respected financial advisor; a second user agent is based on a personality of a famous musician; and a third user agent is based on a personality of a professional athlete. Each of these user agents is assigned a category of tasks or actions according to their personality and/or specialty. For instance, the user agent based on the personality of the financial advisor is assigned the categories of money, investing, banking, and related categories. The user agent based on the personality of the musician is assigned the categories of music, culture, arts, entertainment, social, and related categories. The user agent based on the personality of the professional athlete is assigned the categories of sports, fitness, health, food, nutrition, and related categories. This user agent is also designated as a default user agent and is assigned any category not specifically assigned to another user agent. The user interacts with his HPED and requests information relating to a healthy diet. Since this category is assigned to the professional athlete, this user agent is displayed to the user and assists the user in executing this request. The user then requests a summary of current stock market conditions. Since this category is assigned to the financial advisor, this user agent is displayed to the user and assists the user in executing this request.

Consider an example in which a user purchases a mobile application that determines a personality type of the user. Based on this personality type, the mobile application assigns different user agents with different personalities to tasks requested by and executed for the user. For instance, when the user seeks assistance with financial matters, a first user agent with a first personality type is assigned to the user.

When the user seeks assistance with health matters, a second user agent with a second personality type is assigned to the user.

Assignment of different user agents can also be based on other user characteristics or actions, such as a state-of-mind or mood of the user or a type of physical activity in which the user is engaged. For instance, an HPED of a user detects that its user is sad or depressed and assigns a user agent with a personality that is more comforting, caring, listening. As another example, the HPED detects that the user is in a museum and assigns a user agent adapted for giving tours.

Each of the multiple different user agents can be assigned a name and physical features or characteristics by the user, an electronic device, and/or a software program. As an example, a user purchases a user agent having a personality of Abraham Lincoln. This user agent is assigned a name (Abe) and physical features to look like Abraham Lincoln. As another example, a user purchases a user agent to assist the user in matters of health, spirituality, and family. The user names the user agent "mom" and provides pictures so the user agent looks like his own mother.

Figure 11:
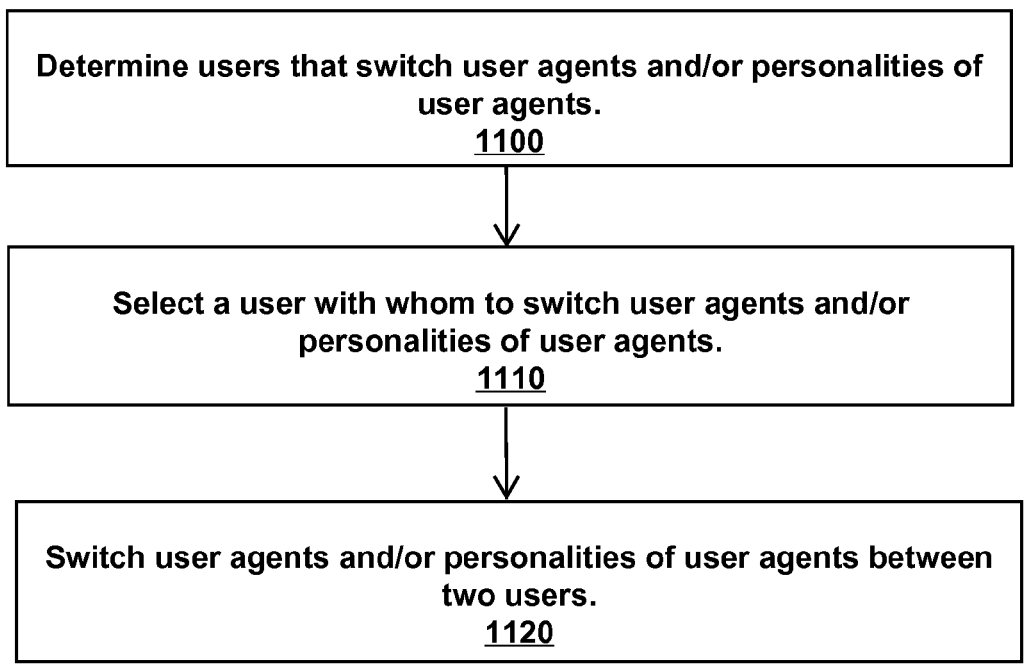
FIG. 11 is a method to switch user agents between users in accordance with an example embodiment.

FIG. 11 is a method to switch user agents between users.

Block 1100 states determine users that switch user agents and/or personalities of user agents.

By way of example, a user, an electronic device, or a software application can search, obtain, receive, and/or retrieve users that have, can, and/or will switch user agents or personalities of user agents with other users. Names of discovered users are displayed and/or provided to the searching user.

Block 1110 states select a user with whom to switch user agents and/or personalities of user agents.

By way of example, a user searches for one or more other users with whom to switch user agents. Information about the user, the user agent, and/or the personality of the user agent is provided to the searching user. For instance, a profile of a personality of a user agent is displayed to the searching user so this user can assess the personality of the user agent and make a determination as to whether the user desires to switch to use this user agent. As another example, an electronic device discovers this information and provides it to the user (for example, a social networking website recommends user agents and/or personalities to its members so the members can switch user agents).

Block 1120 states switch user agents and/or personalities of user agents between two users.

Consider an example in which a first user executes on his HPED a first user agent with a first personality (such as being an ISTJ personality type expressing introversion, sensing, thinking, and judgment). A second user executes on her HPED a second user agent with a second personality (such as being an INTP personality type expressing introversion, intuition, thinking, and perception). Both users belong to a social network. While the first user is logged into the social network, he sends to the second user a request to switch user agents for a period of one week. The second user receives this request and agrees to switch user agents. The first and second users switch user agents such that the second user agent with the INTP personality type executes on the HPED of the first user, and the first user agent with the ISTJ personality type executes on the HPED of the second user. After expiration of one week, the user agents switch back such that the first user agent executes on the HPED of the first user, and the second user agent executes on the HPED of the second user.

Consider an example in which a user is a member of a social network (such as FACEBOOK). The user desires to try another user agent and searches the social network for user agents that friends of the user have. This search displays descriptions of personalities of user agents of the user's friends. Some of these user agents are customized in that they adapt to interact with a personality of their user. The user selects one of these user agents and switches user agents such that the selected user agent of a friend of the user becomes the user agent for the user. Since the user and the friend both belong to the social network and are social network friends, the user has permission to use the personality of the user agent of the friend (i.e., the user is not required to request permission to try the personality of the friend's user agent since the user and the friend are friends on the social network). The friend of the user continues to execute the user agent while the user also executes this user agent. After a trial period, the user decides that he likes this user agent and decides to keep executing this user agent.

Example embodiments include instances in which a user switches a personality of his user agent without switching with another user. For instance, a user can switch or change the personality of his user agent with another personality with or without switching with another user.

Consider an example in which a user executes a mobile application that provides information about user agents of other users that also execute the mobile application. This application enables the user to search, view, build, select, purchase, try, and/or switch user agents. The mobile application displays summaries of various different personalities of user agents such that the user can select one of these personalities. The user selects a personality, and this personality executes as the user agent of the user. As such, the user can tryout or borrow various different personalities to find a personality that the user desires. For instance, the user selects one personality for his user agent and tries this personality for a few days, but decides that this personality is not friendly enough. So, the user selects another personality for his user agent and tries this personality for a few days and discovers a likeness for this personality. This selected personality executes as the user agent until the user decides to switch again or obtain a new or different user agent personality.

Consider another example in which a user executes a mobile application that provides multiple different user agents with different personalities. Users can temporarily execute or try user agents to help them decide which personality, traits, or characteristics that they like. Users can also custom build their own personalities for their user agents. For instance, users select personality types, traits, or characteristics and then these selected items are built into a custom personality for a user agent. The user then tries the user agent and can later modify, switch, or change the personality, traits, or characteristics. For instance, a user can switch from ISTJ personality type to an INTP personality type. Alternatively, the user can alter a certain trait (such as selecting or requesting a user agent that smiles and laughs more often). Thus, by selecting and/or switching between entire personalities or portions of a personality, users can custom build personalities for their personal use.

Figure 12:
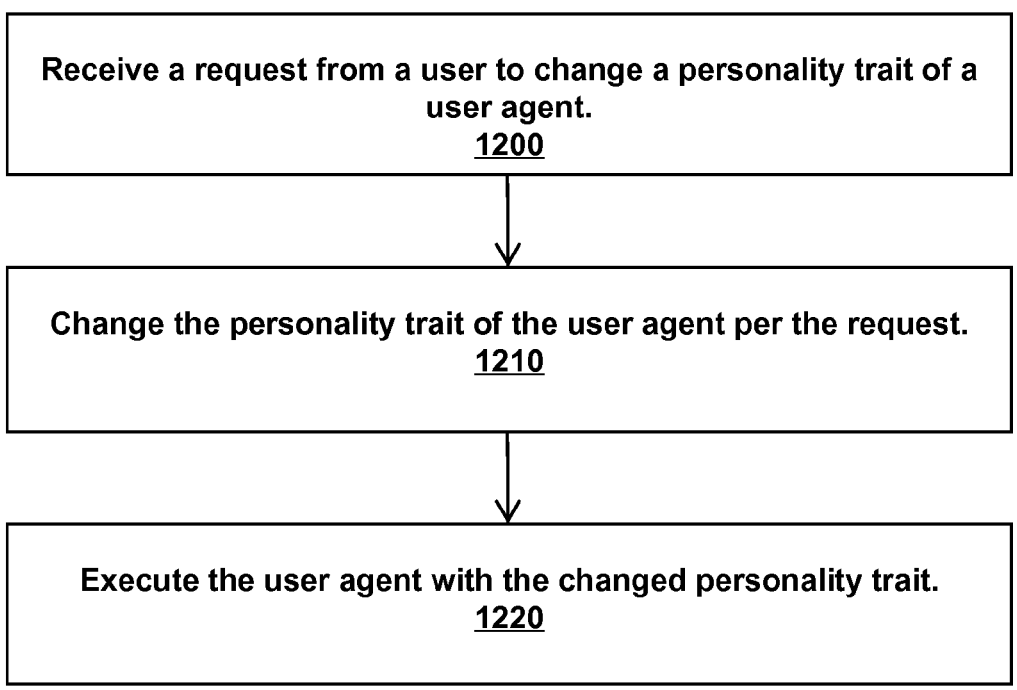
FIG. 12 is a method to change a personality trait of a user agent in accordance with an example embodiment.

FIG. 12 is a method to change a personality trait of a user agent.

Block 1200 states receive a request from a user to change a personality trait of a user agent.

For example, a user desires to change a personality trait of a user agent that executes for the user. The user provides a request to make this change to an electronic device or the user agent.

The request to change a personality trait can be a direct request from the user (such as a user asking a user agent to make a change to its personality). Alternatively, the request can be an indirect request (such as the user agent receiving information from which a presumption, prediction, or assumption is made that the user desires to make a change to the personality). Alternatively, the request can be a command, an instruction, or an action to change a personality trait of the user agent (such as the user viewing a personality profile of the user agent on a display and changing a trait in this profile).

Block 1210 states change the personality trait of the user agent per the request.

The requested change is made to the personality trait of the user agent. This request can be to change one or more traits or characteristics of a personality or change to a new or different personality.

Block 1220 states execute the user agent with the changed personality trait.

Consider an example in which a user executes a user agent with a personality according to the Big Five Factors. The user desires to have his user agent function with more agreeableness (one of the five personality traits). In response to this request, the personality of the user agent is changed so actions of the user agent are more kind, sympathetic, cooperative, considerate, and warm.

Consider an example in which a user purchases a user agent that communicates with a natural language user interface (NLUI). The user speaks the following instruction to the user agent: "Would you please smile more." In response to this request, the user agent adjusts its personality to smile more. Thereafter, the user agent offers more smiles when communicating with the user.

Consider an example in which a user agent has a personality of ISFJ (introversion, sensing, feeling, judging) that is quiet, kind, and conscientious. The user instructs the user agent to change its personality to ISFP (introversion, sensing, feeling, perception) that is quiet, serious, sensitive, and kind. Based on this request, the personality of the user agent changes from executing ISFJ to executing ISFP.

Consider an example in which a user has a user agent with a personality. During a conversation with the user agent, the user makes the following statement: "Don't get so upset." The user agent takes this comment as an indirect request to change its personality to not get so easily upset. Based on this comment, the user agent changes its personality. Thus, the user agent automatically adjusts its personality to preferences that the user agent believes the user desires.

Consider another example in which a user executes a user agent with a personality that gives recommendations to the user. The user is unhappy with the personality of his user agent and decides to try another personality. The user navigates to a website that offers or sells user agents and/or personalities of user agents. This website offers a relatively large number of different types of personalities of user agents. The user agent asks his current user agent for a recommendation on which user agent to try. In response to this request, the current user agent provides a recommendation for the user to try a user agent having traits of listening, reflecting, paying attention to detail, thinking, and making objective and logical decisions. The user agent identifies a specific user agent personality to the user, and the user downloads this identified personality to his user agent.

Consider an example in which a user views on a display of his electronic device a personality profile of his user agent. This profile includes scale scores, rates, ranks, or percentages for all of the personality traits of the user agent (including verbal and nonverbal communication preferences). For instance, the personality trait of "frowns" is shown with a 1 to 10 scale score of 6 (with 1 being never frowns and 10 being frowns quite frequently). The user adjusts the scale score to 3. Thereafter, the user agent executes with this frown scale score and hence frowns less often. The user can manually adjust scale scores for each of the personality traits of the user agent.

Figure 13:
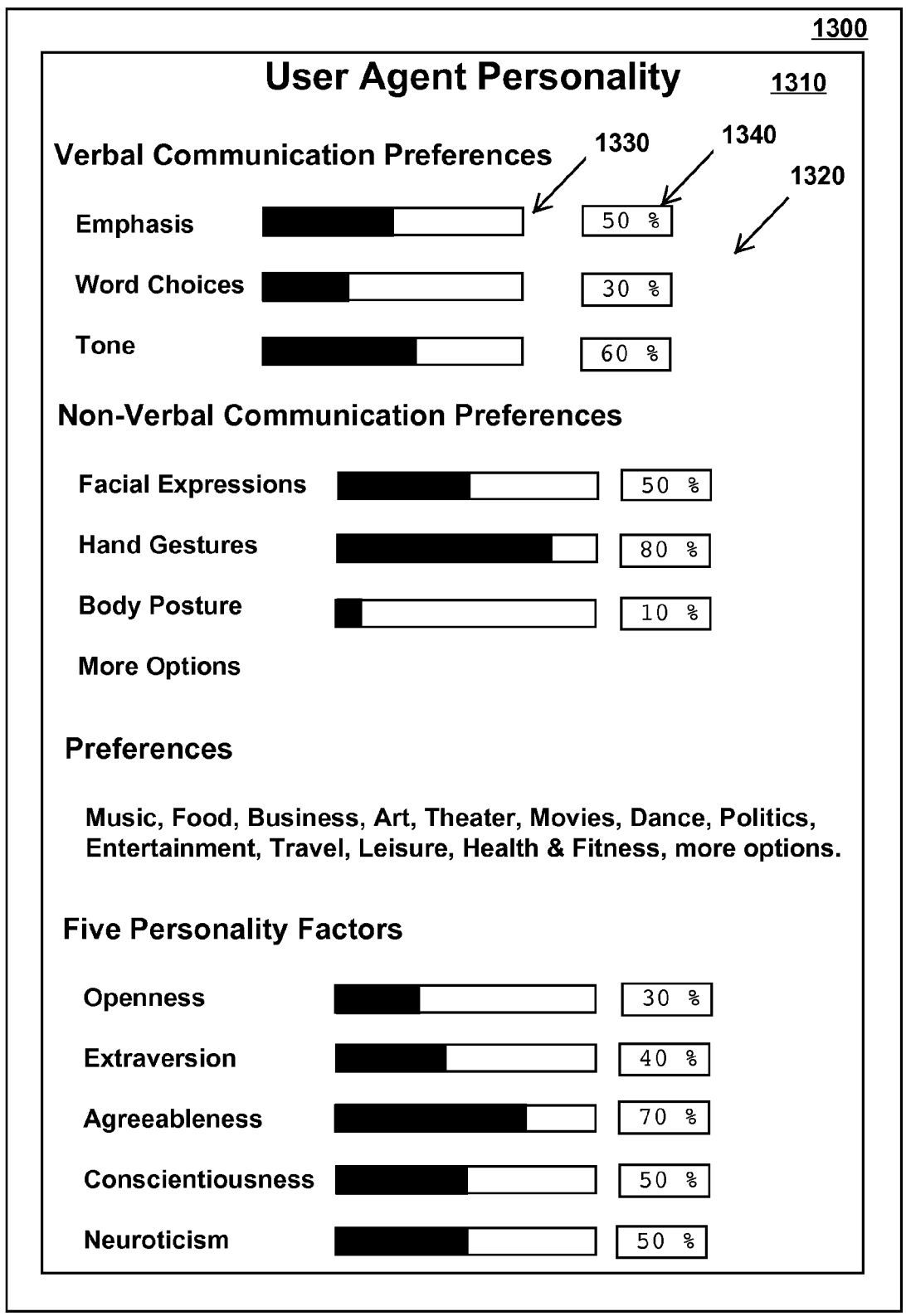
FIG. 13 is an electronic device with a display that shows a graphical user interface (GUI) of a user agent personality in accordance with an example embodiment.

FIG. 13 is an electronic device 1300 with a display 1310 that shows a graphical user interface (GUI) 1320 of a user agent personality. This GUI enables a user to manually adjust, change, and/or modify a personality of a user agent. For example, a user can view and change personality traits, personality characteristics, verbal communication preferences, nonverbal communication preferences, personality preferences, and personality factors (such as the Big Five Factors).

By way of example, the GUI 1320 illustrates verbal communication preferences, nonverbal communication preferences, preferences, and five personality factors. Each of these includes a slide bar and a corresponding box. For example, slide bar 1330 for "Emphasis" is set to fifty-percent (50%) that is shown in box 1340. This amount of fifty percent indicates a score, rank, rating, or amount of the verbal communication preference "Emphasis" that the user agent uses when communicating with the user. The user can adjust the slide bars or amounts in the boxes to increase or decrease the corresponding personality of the user agent.

FIG. 13 shows an example GUI that enables a user to adjust various aspects of a personality. Examples of these aspects (such as traits, modalities, categories, subcategories, etc.) are further discussed in connection with block 220 and methods discussed herein.

Consider an example in which a user wants to reduce an amount of hand gestures that the user agent uses in communicating with the user. As shown in FIG. 13, the current settings for "Hand Gestures" is eighty-percent (80%). By clicking or dragging the slide bar and typing a different percentage into the box, the user can adjust the amount of hand gestures that the user agent utilizes. For instance, if the user agent sets this amount to ten percent (10%), then the user agent would infrequently use hand gestures as a form of nonverbal communication.

Consider an example in which a user wants to increase a preference for jazz music that the user agent exhibits. The user can click-on or highlight "Music" under "Preferences" in FIG. 13 in order to display a plurality of subcategories. Each of these subcategories has a slide bar and box. For instance, clicking on "Music" displays the subcategories of "Jazz, Rock, Country, Reggae, Blues, Hip-Hop, Heavy Metal, and Classical." The user can then adjust the slide bar for "Jazz" to increase or decrease this musical preference.

Figure 14A:
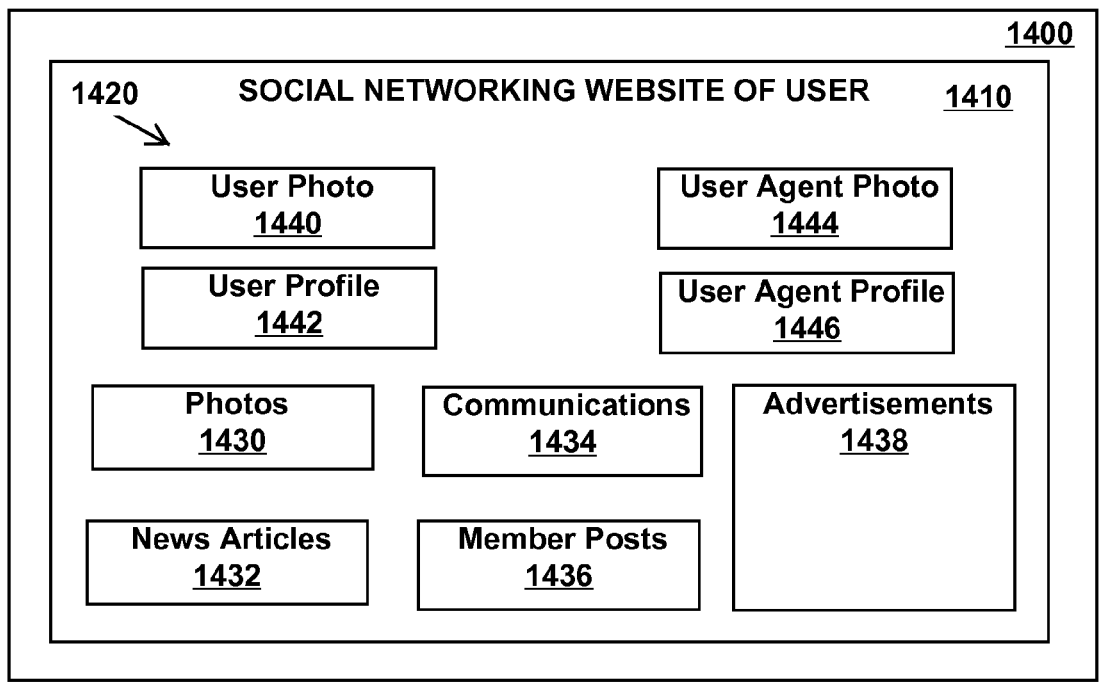
FIG. 14A is an electronic device with a display that shows a social networking website of a user with photographs and profile information of the user and a user agent of the user in accordance with an example embodiment.

FIG. 14A is an electronic device 1400 with a display 1410 that shows a social networking website 1420 of a user with photographs and profile information of the user and a user agent of the user.

By way of example, the social network website 1420 of the user includes one or more of photographs 1430, news articles or web feeds 1432, communications with individuals or other members 1434 (such as a tool or software program that enables a user to chat, SMS, video, and/or contact another individual), member posts 1436, advertisements 1438, a photograph of the user 1440, personal information and/or profile information 1442 about the user, a photograph of the user agent 1444, and personal information and/or profile information 1446 about the user agent. One or more of these items can be simultaneously displayed or displayed on separate web pages.

The personal information and/or profile information of the user or user agent includes personal preferences, information that describes a personality of the user and/or user agent, biographical information about the user and/or user agent, and/or user profile information.

Figure 14B:
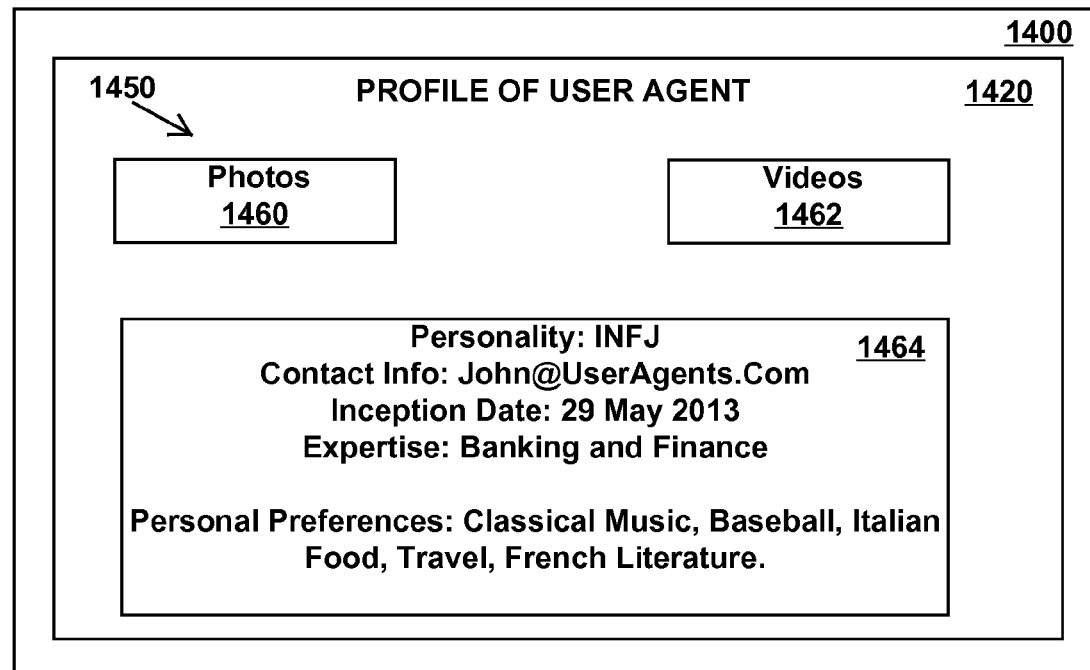
FIG. 14B is the electronic device of FIG. 14A with the display that shows profile information of the user agent in accordance with an example embodiment.

FIG. 14B is the electronic device 1400 with the display 1410 that shows profile information 1450 of the user agent.

The profile information 1450 of the user agent includes photographs 1460 of the user agent, videos 1462 of the user agent, personal information 1464 that describes a personality of the user agent, contact information for the user agent, an inception date for the user agent (e.g., a date the user agent was purchased, offered for sale, first used in public, finished being programmed, died if the user agent is based on a deceased person, and/or born if the user agent is based on a living person), an expertise or field of specialty of the user agent (such as specializing in finance, culture, art, relationships, music, science, etc.), and personal preferences of the user agent (such as music, sports, culture, food, travel, etc.).

Consider an example in which the user agent is based on a real person (such as a person still living or a deceased person). The profile information includes a picture or an image of the person, biographical information, and personal preferences (such as favorite activities, likes and dislikes, and other personal information). This profile information also includes a description of the personality of the person on whom the personality of the user agent is based.

Consider an example in which a user belongs to a social network (such as FACEBOOK). The user is curious as to what type of user agent a celebrity executes. The user navigates to the social networking page of the celebrity and reads the profile information of the celebrity's user agent. This profile information provides insight into the personality of the celebrity since this user agent interacts with the celebrity (such as performing searches for the celebrity, providing recommendations to the celebrity, speaking with the celebrity, etc.).

Figure 15:
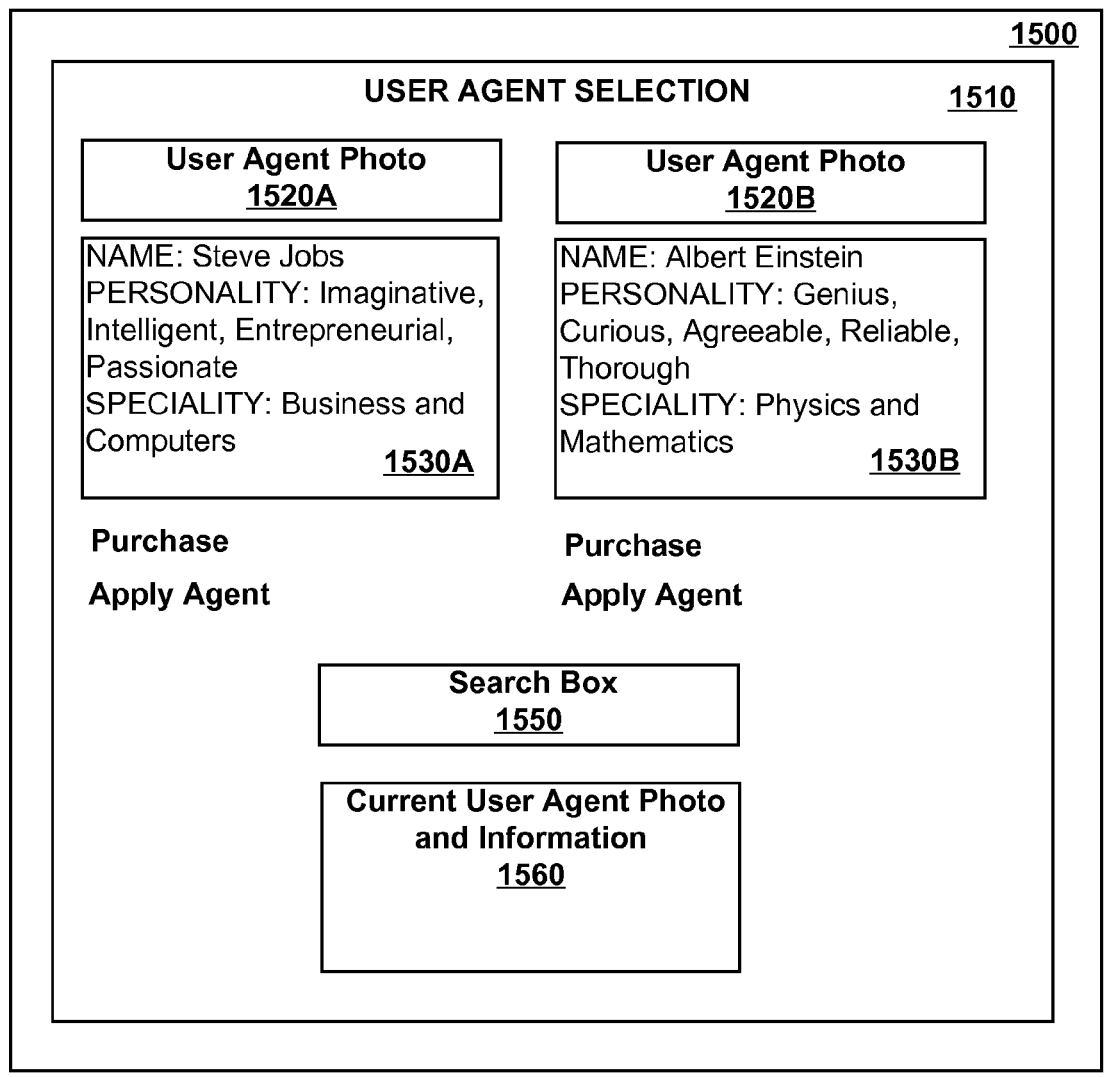
FIG. 15 is an electronic device with a display that shows images and profile information of multiple different user agents in accordance with an example embodiment.

FIG. 15 is an electronic device 1500 with a display 1510 that shows images 1520A and 1520B and profile information 1530A and 1530B of multiple different user agents. This profile information includes a name of the user agent, a description of the personality of the user agent, and a specialty of the user agent. A selection is provided so a user can purchase a user agent, and a selection is provided so the user can apply the selected user agent (such as selecting the "Apply Agent" loads and/or activates the selected user agent as the user agent for the user). A search box 1550 enables a user to search for user agents (such as searching with keywords, names, personality types, etc.).

By way of example, image 1520A is a picture of Steve Jobs, and the profile information includes name (Steve Jobs), personality (imaginative, intelligent, entrepreneurial, passionate), and specialty (business and computers). Image 1520B is a picture of Albert Einstein, and the profile information includes name (Albert Einstein), personality (genius, curious, agreeable, reliable, thorough), and specialty (physics and mathematics).

Display 1510 also shows an image 1560 of a current or selected user agent and profile information about this selected user agent (such as user agent that the user currently executes or user agent that is currently selected to purchase). Selection of a different user agent (such as user agent 1520A) causes the selected user agent to appear in image 1560.

Display 1510 provides a graphical user interface (GUI) that enables user to search user agents, purchase user agents, select and activate user agents, and obtain more information about user agents. By way of example, this GUI can be presented at a website or from an application (such as a mobile application that executes on a portable electronic device of a user).

Figure 16:
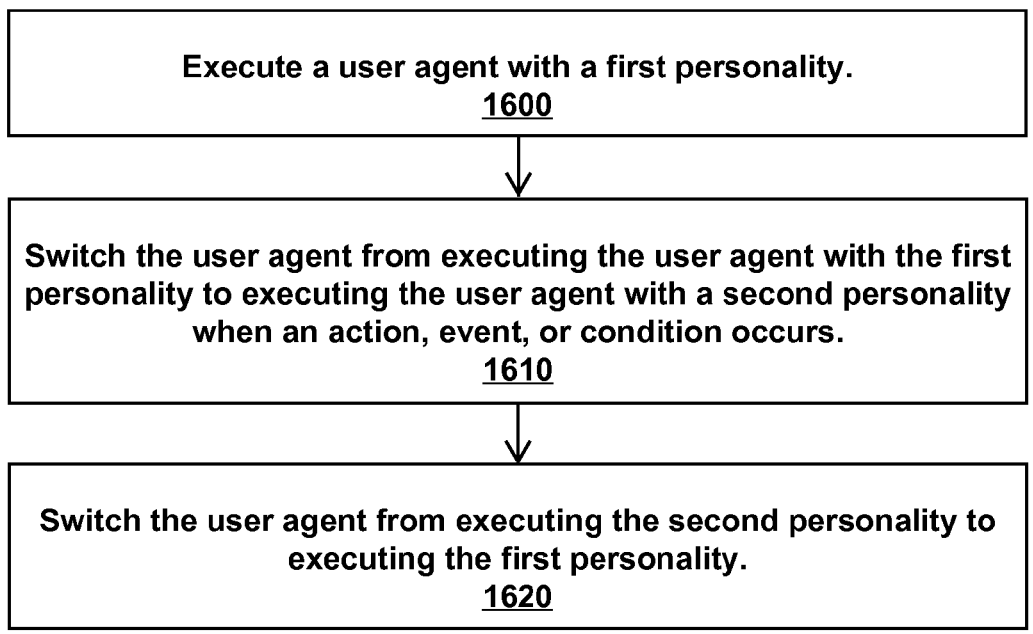
FIG. 16 is a method to change a personality of a user agent based on a presence and/or identity of a third party in accordance with an example embodiment.

FIG. 16 is a method to change a personality of a user agent based on a presence and/or identity of a third party.

Block 1600 states execute a user agent with a first personality.

The user agent implements a first personality in order to interact with the user. By way of example, the user agent is an intelligent personal assistant that communicates via a natural language user interface and assists the user in executing searches, performing tasks, providing information, navigating the internet, etc. During these actions, the user agent uses the first personality to interact with the user.

Block 1610 states switch the user agent from executing the first personality to the user agent executing a second personality when an action, event, or condition occurs.

When an action, event, or condition occurs, the user agent switches from executing or portraying the first personality to executing or portraying the second personality. The user agent then uses the second personality to interact with the user and perform actions. The occurrence or detection of the action, event, or condition triggers or causes a switch from the first personality to the second personality. For example, the first personality is replaced with or changed into the second personality. Alternatively, the user agent can change (such as changing from a first user agent with a first personality to a second user agent with a second personality).

Switching or changing of user agent personalities occurs while the user continues to interact with the electronic device. For instance, the user agent executes a first personality while the user interacts and gives instructions to the electronic device and/or user agent. The user agent changes to the second personality while the user continues to interact and give instructions to the electronic device and/or user agent.

Examples of actions, events, or conditions include, but are not limited to, the user agent executes the first personality while the user is alone with the user agent (such as being separated or isolated from other people so the other people cannot hear, read, or discern communications between the user and the user agent), while the user has a private communication with the user agent (such as a confidential conversation or confidential instructions not in a presence of or discernable by other individuals), or while communication between the user and the user agent occurs in a presence of or with knowledge of a designated person (such as the user authorizing the user agent to engage the user with the first personality when a specified person is also present with the user). As additional examples, a certain personality executes when the user is at a certain geographical location (such as execute the first personality while the user is physically located at his office), when the user executes a predetermined action or search (such as execute the first personality when the user executes a search engine request directed to finance), during a certain time of day (such as switch to the second personality and execute this personality between 8:00 p.m. and 6:00 a.m.), when the user uses a predetermined electronic device (such as switch to the second personality when the user interacts with the user agent on an HPED of the user), when the user is not physically present or in proximity to minors (such as execute the first personality unless a person under eighteen years of age is proximate the user and/or the user agent), when the user is physically present or in proximity to a specified person (such as execute the second personality while the user is physically present or in proximity to his family). As yet another example, the personality of the user agent is set to a default position and changes from this default position when an action occurs or an event is detected.

Block 1620 states switch the user agent from executing the second personality to executing the first personality.

When a condition is satisfied, the personality of the user agent changes from the second personality back to the first personality. The user agent then executes with the first personality while the condition is satisfied. For example, the second personality is replaced with or changed back into the first personality. Alternatively, a different user agent executes (such as changing a second user agent with a second personality back to the first user agent with a first personality). This switch can occur after the occurrence of the action, event, or condition.

Consider an example in which a user agent executes a first personality that occasionally uses language and gestures intended for mature or adult audiences (such as using adult language intended for persons over the age of eighteen years). While a user is communicating with the user agent, a minor child walks within proximity of an electronic device on which the user agent executes. The minor child is near the electronic device but is not interacting with the electronic device (for example, the minor child can see the display or hear the user agent speaking from the electronic device). The user agent detects a presence and identity of this minor child and changes to a second personality that uses language and gestures suitable for minor children. When the minor child leaves, the user agent reverts back to the first personality. Thus, while the minor child is proximate the electronic device, the user agent does not utilize adult language.

Consider another example in which a user has a user agent with two distinct and different personalities and preferences. When the user is alone or has a private communication with his HPED, the user agent executes with a first personality. When a third party is present, then the user agent executes with a second personality. For instance, the user agent executes with the second personality when the user and a third party both simultaneously interact on the HPED, when the user agent communicates over speakers of the HPED with third parties in proximity to the HPED, or when the user agent communicates with the user and third parties can discern the communication.

Consider an example in which the user is located in a room with other persons that can hear the user agent speaking to the user over speakers. During this time, the user agent executes a first personality. The user decides that the conversation should be private and uses headphones or an earpiece such that only the user can hear the user agent speaking. This action causes the user agent to switch and execute a second personality. When the user removes the headphones, the user agent switches back to the first personality.

Consider an example in which an HPED of a user executes a user agent with a personality that specializes in law while a user is at work (such as during business hours of Monday thru Friday from 8:00 a.m. to 5:00 p.m.). When the user leaves work or during non-business hours, the user agent changes from a personality that specializes in law to a personality that emulates a personality of its user. The user agent can use a Global Positioning System (GPS) to determine a location of the user and use this location as an event to switch personalities.

Consider an example in which a user agent executes with a personality based on INTP (introversion, intuition, thinking, perception) when the user agent detects and identifies that a husband interacts with an HPED. When a wife of the husband interacts with this HPED, the user agent switches to a personality based on ESFJ (extroversion, sensing, feeling, judgment).

Consider an example in which a user purchases a user agent with multiple different personalities. The user has a notebook computer that is primarily used for work and a tablet computer that is primarily used for free-time, entertainment, or non-work related tasks. When the user interacts with the user agent on the notebook computer, the user agent executes with a conservative personality. When the user interacts with the user agent on the tablet computer, the user agent executes with a liberal personality.

Consider an example in which a user purchases several different user agents with different personalities. A first user agent with a first personality is set as a default to interact with the user. When the user issues a spoken or written command (such as speaking "switch agents"), the first user agent switches to a second user agent with a second personality. Alternatively, the user can issue a name of the second user agent to perform the switch or a name of the second personality to perform the switch. For instance, if the name of the second user agent is Einstein, then the user issues a spoken or written command (such as speaking "agent Einstein") to perform a switch to this user agent.

Consider an example in which a user agent has multiple personalities, and selection of a personality to execute is based on an identity of a person using the electronic device on which the user agent appears. For example, different family members use a tablet computer. When a child uses the tablet computer, the user agent identifies the child and employs a first personality suitable for the child (such as executing a personality that emulates or corresponds to the specific personality of the child). When a teenager uses the tablet computer, the user agent identifies the teenage and employs a second personality suitable for the teenager (such as executing a personality that emulates or corresponds to the specific personality of the teenager). When a father uses the tablet computer, the user agent identifies the father and employs a third personality suitable for the father (such as executing a personality that emulates or corresponds to the specific personality of the father). By way of example, facial recognition software identifies individuals using the tablet computer.

Consider an example in which a user agent has multiple personalities, and selection of a personality to execute is based on an identity of a person in proximity to the user of the electronic device. For example, a user owns an electronic device that executes a user agent with a personality. When the user agent or electronic device detects the physical presence of a child, then the user agent switches to a different personality or modifies its personality (such as changing the tone of its voice, changing its vocabulary or word choice, changing its physical appearance, changing its preferences, and/or changing traits of its personality). When the user agent or electronic device detects the physical presence of a business associate of the user, then the user agent switches to a different personality or modifies its personality (such as changing its appearance to a more formal attire, changing its manures and gestures suitable for business customs, changing its personality to more diplomatic, decisive, proud, intelligent, and confident).

Figure 17:
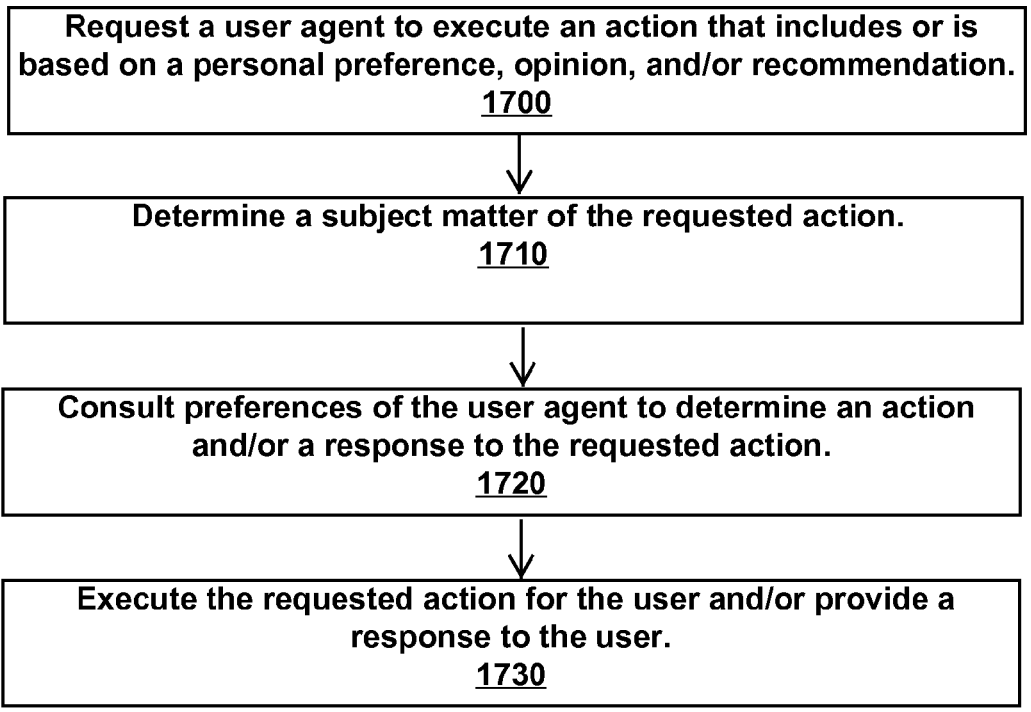
FIG. 17 is a method to provide a response to an inquiry based on preferences of a user agent in accordance with an example embodiment.

FIG. 17 is a method to provide a response to an inquiry based on preferences of a user agent.

Block 1700 states request a user agent to execute an action that includes or is based on a personal preference, opinion, and/or recommendation.

By way of example, a user asks his user agent a question in which a response to the question includes an opinion of the user agent (i.e., a personal view, belief, or judgment based on a matter considered subjective or less than absolute or involving emotion or interpretation of facts). For instance, the user asks his user agent the following question: "What do you think about the current political crisis?" As another example, a user asks his user agent for a recommendation or for advice. For instance, the user asks his user agent the following question: "What road is the quickest way to Cleveland?" As another example, the user agent searches for hotels and restaurants and uses personal preferences of the user agent to rate the hotels and restaurants. For instance, the user agent prefers hotels on the beach and prioritizes these hotels. As yet another example, the user agent plays music for the user based on musical preferences of the user agent. For instance, the user agent prefers hip-hop over rock-n-roll and plays more hip-hop music selections to the user.

Block 1710 states determine a subject matter of the requested action.

For example, keywords are extracted from an inquiry to determine its subject matter. As another example, subject indexing describes or classifies a user request by index terms of other symbols to determine what the inquiry is about. Extraction indexing extracts words from the inquiry or the action, calculates word frequencies, and determines stop words to determine the subject matter. As another example, the subject matter is determined from an analysis of word patterns in the inquiry. As yet another example, words in the request are compared with previous requests having known subject matters to determine the subject matter of the inquiry. As yet another example, an automated document or subject classification technique is used (such as one using classifiers, pattern recognition, machine learning, etc.).

Block 1720 states consult preferences of the user agent to determine an action and/or a response to the requested action.

The user agent has a personality that includes personal preferences with regard to various categories. Examples of preferences and categories are discussed herein. By way of further example, preferences are categorized and then scored and/or weighted.

Consider an example in which preferences of the user agent are divided into numerous categories (such as music, food, business, art, theater, movies, dance, politics, culture, entertainment, travel, leisure, etc.). These categories are further divided into numerous subcategories (such as dividing music into country, rock, jazz, classical, hip hop, etc.). These subcategories are then scored, ranked, weighted, and/or given a probability. Then, based on these scores, ranks, weights, and/or probabilities, a determination is made of an action and/or a response to the requested inquiry or the requested action that is based on an opinion or recommendation of the user agent.

Block 1730 states execute the requested action for the user and/or provide a response to the user. For example, the response is displayed, transmitted, stored, or spoken.

Example embodiments include user agents with multiple different personalities and multiple different user agents each with a different personality. As such consider an example in which a user has an HPED that executes a user agent with multiple different personalities or multiple different user agents with different personalities. Each personality is assigned a category or a task. For instance, a user agent with a personality of John Lennon is assigned to tasks and/or actions associated with music. A personality of Stanley Kubric is assigned to tasks and/or actions associated with movies or film. A personality of Steve Jobs is assigned to tasks and/or actions associated with computers or business. A personality of Warren Buffett is assigned to tasks and/or actions associated with money or finance. When a user requests or initiates an action to a certain category, the corresponding user agent with the personality is retrieved and executed. For example, when the user reads an online Internet news article directed to business, the Warren Buffett user agent is displayed to assist the user.

Consider another example in which a user has an electronic device that communicates a user agent with multiple different personalities or multiple different user agents with different personalities (such as the user agent(s) executing from a cloud with which the electronic device communicates). A current or present state-of-mind or emotion of the user is determined. Based on this determination, a personality is selected. For instance, if a determination is made that the user is sad, a user agent with a personality is retrieved to match or engage this emotion (such as a user agent with a personality that is thoughtful, positive, listening, thinking, and comforting). By contrast, if a determination is made that the user is happy, a user agent with a different personality is retrieved to match or engage this emotion (such as a user agent with a personality that is smiling, upbeat, positive, and enthusiastic). Thus, a personality is selected to be compatible with a present emotion of the user.

Since each personality is different and distinct, two personalities can give different results or answers to a same query. For instance, a response to a user query can be based on both subjective and objective information. This subjective information (such as opinions, recommendations, or user agent preferences) can cause the results to be different. For example, a user asks two user agents with two different personalities for a recommendation as to a best restaurant. One user agent recommends one restaurant, and another user agent recommends another restaurant.

Multiple different personalities can collaborate in order to render a majority, collective, unanimous, or consensus decision.

Consider an example in which a user desires to purchase a new smartphone and requests a recommendation from his user agent for a make and model. The user agent of the user contacts user agents of friends of the user (for example, the user and the friends are members in a social network). These user agents consult each other or collaborate together and arrive at a consensus for a make and model smartphone for the user. This consensus or recommendation is provided to the user (for example, a single recommendation is provided to the user agent from the multiple different user agents).

Furthermore, when multiple different user agents collaborate and/or provide input for an action or task, each personality can be assigned a different weight to different categories. Consider an example in which each user agent is assigned a weight to different categories for which the user agent has knowledge, preferences, opinions, etc. Consider an example of two categories: music and science. A user agent with personality of John Lennon is assigned a weight of 0.9 for music and a weight of 0.3 for science, whereas a user agent with a personality of Albert Einstein is assigned a weight of 0.6 for music and a weight of 0.95 for science.

When these two user agents collaborate on a science task, the opinion or recommendation of the Albert Einstein user agent is weighted more heavily than the opinion or recommendation of John Lennon.

Consider an example in which a user agent belongs to a social network in which friends of the user have user agents. A benefit or privilege of being a member to this social network is that the user agent of the user can consult one or more of the user agents of the friends. So, when the user agent of the user wants to take an action, this user agent can consult and/or cooperative with other user agents in the circle of friends of the user in order to assist in executing the action.

Consider another example in which a user belongs to the social network FACEBOOK. Friends of the user at this social network have access to a user agent of the user. For instance, these friends can borrow this user agent to assist in performing actions and tasks. For example, a friend of the user wants to know the opinion of the user agent of another member, logs onto the social network, and sends this request to the user and/or user agent of the other member. As another instance, these friends share computer resources (such as computing power of user agents). The user borrows user agents of friends to assist the user in executing processing tasks. For instance, a friend of the user has a user agent with a specialty or expertise in finance. The user uses this user agent to assist the user in handling matters relating to finance and banking. The owner of this user agent does not object or allows the user to use this user agent since the owner and the user are friends on the social network.

Figure 18:
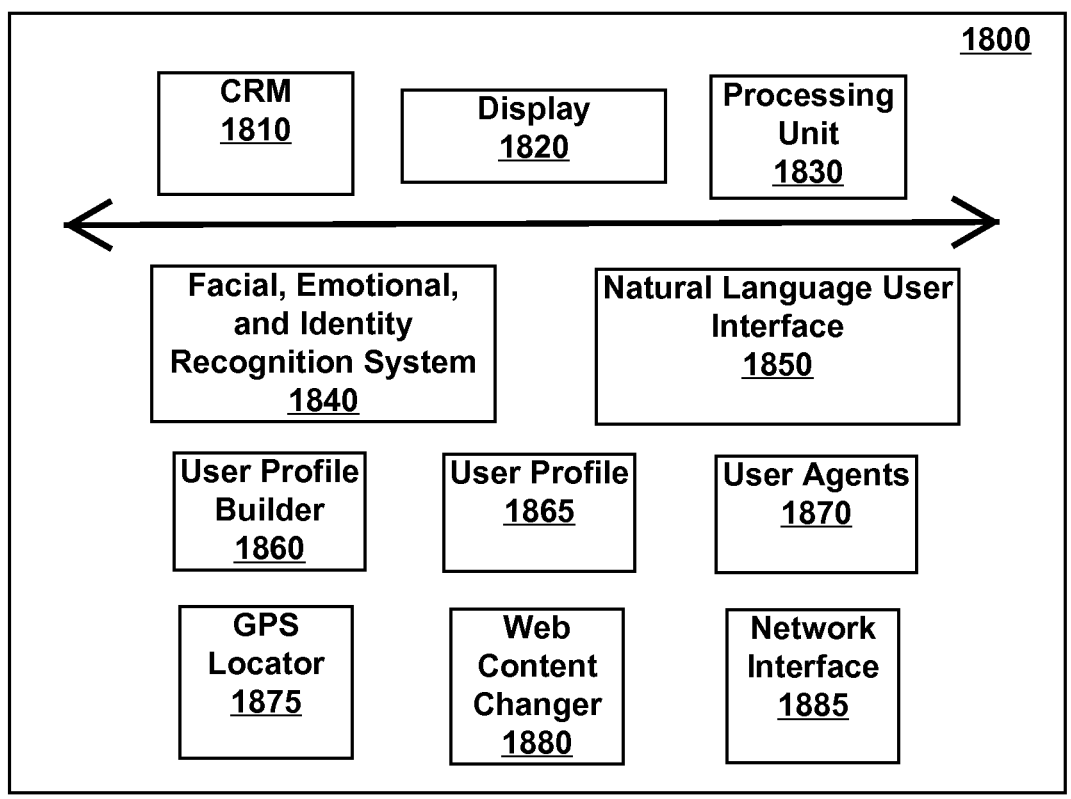
FIG. 18 is an electronic device in accordance with an example embodiment.

FIG. 18 is an electronic device 1800 in accordance with an example embodiment. The electronic device includes components of computer readable medium (CRM) or memory 1810, a display 1820, a processing unit 1830, facial, emotional, and identity recognition system 1840 (such as software program and/or hardware), a natural language user interface (NLUI) 1850, a user profile builder 1860, a user profile 1865, a user agents 1870, GPS locator 1875, a web content changer 1880, and a network interface 1885. FIG. 18 shows these components in a single electronic device. Alternatively, one or more of these components can be distributed or included in various electronic devices, such as some components being included in an HPED, some components being included in a server, some components being included in storage accessible over the Internet, components being in various different electronic devices that are spread across a network or a cloud, etc.

The processor unit 1830 includes a processor (such as a central processing unit, CPU, microprocessor, application-specific integrated circuit (ASIC), etc.) for controlling the overall operation of memory 1810 (such as random access memory (RAM) for temporary data storage, read only memory (ROM) for permanent data storage, and firmware). The processing unit 1830 communicates with memory 1810 and performs operations and tasks that implement one or more blocks of the flow diagrams discussed herein. The memory 1810, for example, stores applications, data, programs, algorithms (including software to implement or assist in implementing example embodiments) and other data.

The network interface 1885 provides a mechanism for the electrical device 1800 to communicate with other electrical devices, computers, users, or systems. For example, the network interface 1885 enables the electrical device to transmit data through a wired or wireless connection to a network, such as the Internet and/or a cellular network.

Blocks and/or methods discussed herein can be executed and/or made by a user, a user agent of a user, a software application, an electronic device, a computer, a computer system, and/or an intelligent personal assistant.

As used herein, a "celebrity" is a person who has a prominent public profile and is recognized by the general public. Celebrities often have fame, fortune, and/or prominence in a particular field, such as the field of professional sports, entertainment (e.g., movie and/or television actors), or music (e.g. musicians in a popular band).

As used herein, the term "information" includes communication and/or reception of knowledge and/or intelligence, and knowledge obtained from investigation, study, and/or instruction. Information also includes data, such as information in numerical form that can be digitally transmitted and/or processed. Thus, information includes raw data and unorganized facts that can be processed, and also includes processed, organized, and structured, such as data being processed and presented in a useful context.

As used herein, an "intelligent personal assistant" or an "IPA" is a software application that performs tasks or services for an individual user based on user input, location awareness, user interface events, and/or abilities to access private and non-private information. The IPA can be an intelligent software agent that performs tasks with minimum specific directions from users.

As used herein, "nonverbal communication" is the process of communicating through sending and/or receiving wordless messages or visual cues. For example, information is communicated with gestures, glances, proximity, dress, posture, body movement, facial expressions, and eye contact.

As used herein, "private information" includes information pertaining to a user's behavior, actions, and/or communication that occurs in a context in which an individual can reasonably expect privacy, information provided by an individual for a specific purpose and for which the individual can reasonably expect will not be made public (for example, an email between two friends or medical records), and/or information that is not known or intended to be known publicly. Private information can be known by a single person (such as a user knowing a secret about himself or herself), or it can be known to more than one person and still be private (such as personal information about a user that is known to the user, the user's family, and the user's friends but not known to the public or not readily accessible to the public).

As used herein, "personal preferences" are things that are preferred (i.e., set or held before or above other persons or things in estimation, such as like better or choose rather than). For example, a personal preference of an individual occurs when the individual likes or wants someone or something more than someone or something else. User agents can also have personal preferences.

As used herein, the term "personality" is the complex of characteristics that distinguishes an individual's behavior and emotional characteristics from those of another individual. User agents can also have personalities.

As used herein, a "third party" includes a person (such as one or more people) and/or an entity (such as a department, an electronic device, a corporation, a business, a cooperative, a partnership, or other group with whom it is possible to conduct transactions and/or business).

As used herein, a "user" is a human being, a person.

As used herein, a "user agent" is software that acts on behalf of a user. User agents include, but are not limited to, one or more of intelligent agents and/or intelligent electronic personal assistants (IPAs, software agents, and/or assistants that use learning, reasoning, and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "user profile" is personal data that represents an identity of a specific person or organization. The user profile includes information pertaining to the characteristics and/or preferences of the user. Examples of this information for a person include, but are not limited to, one or more of personal data of the user (such as age, gender, race, ethnicity, religion, hobbies, interests, income, employment, education, etc.), photographs (such as photos of the user, family, friends, and/or colleagues), videos (such as videos of the user, family, friends, and/or colleagues), and user-specific data that defines the user's interaction with and/or content on an electronic device (such as display settings, application settings, network settings, stored files, downloads/uploads, browser activity, software applications, user interface or GUI activities, and/or privileges).

As used herein "verbal communication" is the process of communicating with speech, sounds, and/or words. For example, information is communicated with spoken words, phrases, and sentences that have distinct meaning. Information is also communicated with pitch, volume, rate, rhythm, intonation, stress, and accent of the speech. Verbal communication also includes written communication (such as an email, a text, typed words, words that appear on a display, etc.).

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed in a computer system, comprising:
combining, in the computer system, verbal and nonverbal communication preferences of a person and personal preferences of the person to create a personality of the person;
providing, in the computer system, the personality of the person into a personality of a user agent that executes on an electronic device of a user;
receiving, from the user and to the user agent via natural language communication, a search request;
executing the search request with a web search engine; and
ordering results to the search request based on the personality of the user agent as opposed to a personality of the user with the user agent and the user having different personalities;
detecting a presence of a minor person proximate to the electronic device but not interacting with the electronic device; and
changing, based on the presence of the minor person, verbal and nonverbal communication preferences of the user agent so the user agent does not utilize adult language while the minor person is proximate to the electronic device.

2. The method of claim 1 further comprising:
generating the verbal and nonverbal communication preferences and the personal preferences from historical records of the person because the person is deceased.

3. The method of claim 1 further comprising:
receiving, at the electronic device of the user and to the user agent via natural language communication, a command to navigate to a website that has a page layout;
rearranging the page layout of the website to match the personal preferences of the person that are included in the personality of the user agent.

4. The method of claim 1 further comprising:
combining verbal and nonverbal communication preferences of another person and personal preferences of the other person to create a personality of the other person;
providing the personality of the other person into a personality of another user agent that executes on an electronic device of another user;
switching, per consent from the user and the other user, personalities of user agents such that the personality of the user agent executes on the electronic device of the other user and the personality of the other user agent executes on the electronic device of the user.

5. The method of claim 1 further comprising:
displaying, simultaneously on the electronic device and to the user, multiple different user agents that the user can select and purchase;
displaying, with each of the multiple different user agents, a description of a personality of the user agents, names of the user agents, and personal preferences of the user agents.

6. The method of claim 1 further comprising:
determining verbal and nonverbal communication preferences of the user;
changing the verbal and nonverbal preferences of the person that are included into the personality of the user agent to match the verbal and nonverbal communication preferences of the user.

7. A computer system, comprising:
one or more memories that store instructions; and
one or more processors that executes the instructions to:
obtain verbal and nonverbal communication preferences of different persons;
obtain personal preferences of the persons in different categories;
build, based on the verbal and nonverbal communication preferences and the personal preferences, user agents with personalities of the persons;
sell the user agents with the personalities of the persons to users that execute the user agents on electronic devices, wherein one of the persons is a deceased person, and a personality of the deceased person is generated from historical records that include verbal and nonverbal communication preferences and personal preferences of the deceased person;
detect a presence of a minor person proximate to an electronic device executing a user agent with the personality of the deceased person; and
change, based on the presence of the minor person, verbal and nonverbal communication preferences of the user agent so the user agent does not utilize adult language while the minor person is proximate to the electronic device.

8. The computer system of claim 7, wherein the one or more processors further executes the instructions to:
display, on the electronic device, results to a search based on the personality of the deceased person of the user agent and not a personality of one of the users, wherein the user agent and the one of the users have different personalities.

9. The computer system of claim 7, wherein the one or more processors further executes the instructions to:
display, at a social networking website of one of the users, a photograph and a biography of the one of the users;
display, at the social networking website of the one of the users, a photograph and a biography of the user agent, wherein the biography of the user agent includes personal preferences of the user agent in different categories.

10. The computer system of claim 7, wherein the one or more processors further executes the instructions to:
provide, to one of the users and in response to a search, a search response that is based on a personal preference of the user agent that executes on the electronic device of the one of the users;
receive, from the one of the users and to the user agent, a request to explain the search response;
provide, from the user agent and to the one of the users, an answer to the request, the answer identifying the personal preference of the user agent on which the search response is based.

11. The computer system of claim 7, wherein the one or more processors further executes the instructions to:
sell, to a first user, a first user agent with a first personality that executes on a handheld portable electronic device (HPED) of the first user;
sell, to a second user, a second user agent with a second personality that executes on an HPED of the second user;
switch, for a time period agreed upon by the first and second users, the first and second user agents such that the first user agent with the first personality executes on the HPED of the second user for the time period, and the second user agent with the second personality executes on the HPED of the first user for the time period.

12. The computer system of claim 7, wherein the one or more processors further executes the instructions to:
sell, to a user, the user agent with the personality of the deceased person that executes on a handheld portable electronic device (HPED) of the user;
measure performance of the user in executing tasks on the HPED with assistance of the user agent;
modify the personality of the user agent to increase the performance of the user in executing the tasks on the HPED with the assistance of the user agent.

13. A non-transitory computer readable storage medium storing instructions that cause a computer system to execute a method, comprising:
build a personality for a user agent that is based on verbal communication preferences of a person, nonverbal communication preferences of the person, and personal preferences of the person in different categories;
sell the user agent to a user that executes the user agent on a handheld portable electronic device (HPED);
execute, by the user agent, search requests from the user via natural language communication;
display, to the user on the HPED, results to the search requests that are based on the personal preferences of the person in the different categories and not based on personal preferences of the user;
detect a presence of a minor person proximate to the HPED executing the user agent with the personality of the person; and
change, based on the presence of the minor person, verbal and nonverbal communication preferences of the user agent so the user agent does not utilize adult language while the minor person is proximate to the HPED.

14. The non-transitory computer readable storage medium storing instructions of claim 13, wherein the person is deceased, and the verbal communication preferences of the person, the nonverbal communication preferences of the person, and the personal preferences of the person are based on historical records of the person.

15. The non-transitory computer readable storage medium storing instructions of claim 13 further to cause the computer system to execute the method comprising:
rearrange a layout of a website based on the personal preferences of the person in different categories that are embodied in the personality of the user agent;
display the rearranged layout of the website to the user when the user navigates to the website with the HPED.

16. The non-transitory computer readable storage medium storing instructions of claim 13 further to cause the computer system to execute the method comprising:
obtain verbal communication preferences of the user, nonverbal communication preferences of the user, and personal preferences of the user in the different categories;
search through different personalities of user agents to determine which one of the user agents would be compatible with the user;
determine that one user agent is compatible with the user by matching the verbal communications preferences of the user, the nonverbal communication preferences of the user, and the personal preferences of the user in the different categories with verbal communications preferences of the one user agent, nonverbal communication preferences of the one user agent, and personal preferences of the one user agent in the different categories.

17. The non-transitory computer readable storage medium storing instructions of claim 13 further to cause the computer system to execute the method comprising:
   display, on the HPED, verbal communication preferences of the user agent and non-verbal communication preferences of the user agent;
   adjust, with a slide bar, an amount of the displayed verbal communication preferences of the user agent and an amount of the displayed non-verbal communication preferences of the user agent;
   execute, on the HPED, the user agent with the verbal communication preferences and the nonverbal communication preferences of the user agent being adjusted.

18. The non-transitory computer readable storage medium storing instructions of claim 13 further to cause the computer system to execute the method comprising:
   switch, for a time period agreed upon by the user and another user, user agents such that the user agent of the user executes on an HPED of the other user for the time period, and a user agent of the other user executes on the HPED of the user for the time period.

* * * * *